United States Patent
Tajima et al.

(10) Patent No.: US 6,959,493 B2
(45) Date of Patent: Nov. 1, 2005

(54) BRAKE ROTOR AND WHEEL BEARING ASSEMBLY HAVING MAXIMUM ACCEPTABLE RUNOUT VARIATION

(75) Inventors: Eiji Tajima, Shizuoka (JP); Shigeaki Fukushima, Shizuoka (JP); Akira Torii, Shizuoka (JP); Kazuhiro Azuma, Shizuoka (JP); Naoshi Kinpara, Shizuoka (JP); Hisashi Ohtsuki, Shizuoka (JP); Kazunari Yamamoto, Shizuoka (JP); Motoharu Niki, Osaka (JP); Masuo Takaki, Osaka (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 10/372,200

(22) Filed: Feb. 25, 2003

(65) Prior Publication Data

US 2003/0121153 A1 Jul. 3, 2003

Related U.S. Application Data

(62) Division of application No. 09/657,094, filed on Sep. 7, 2000, now Pat. No. 6,575,637.

(30) Foreign Application Priority Data

| Sep. 10, 1999 | (JP) | 11-256578 |
| Oct. 4, 1999 | (JP) | 11-283108 |
| Dec. 21, 1999 | (JP) | 11-363068 |
| Dec. 24, 1999 | (JP) | 11-366169 |
| Dec. 28, 1999 | (JP) | 11-373277 |
| Jan. 14, 2000 | (JP) | 2000-6691 |
| Jan. 14, 2000 | (JP) | 2000-47158 |
| Apr. 28, 2000 | (JP) | 2000-130063 |

(51) Int. Cl.$^7$ .................. B21D 53/26; F16C 13/00
(52) U.S. Cl. .................. 29/894.362; 29/894.3; 384/544; 384/589
(58) Field of Search .................. 29/894.3, 894.362; 384/544, 589, 537, 542, 584; 301/105.1

(56) References Cited

U.S. PATENT DOCUMENTS

| 5,918,707 A | * | 7/1999 | Saunders, III | 188/18 A |
| 6,035,507 A | * | 3/2000 | Bianchi | 29/407.05 |
| 6,250,814 B1 | | 6/2001 | Tajima et al. | |
| 6,309,110 B1 | | 10/2001 | Tajima et al. | |
| 6,357,925 B2 | | 3/2002 | Tajima et al. | |
| 6,364,426 B1 | | 4/2002 | Horne et al. | |
| 6,415,508 B1 | * | 7/2002 | Laps | 29/894.362 |

* cited by examiner

Primary Examiner—Marc Jimenez
(74) Attorney, Agent, or Firm—Wenderoth, Lind & Ponack, L.L.P.

(57) ABSTRACT

A reliable brake rotor and wheel bearing assembly are proposed which make unnecessary adjustment of runout of brake rotor at the customer's factory. For runout of each of the mounting surface and back of the brake rotor itself, and runout of the side of the wheel mounting flange of the inner member to which is mounted the brake rotor, the maximum difference between the peaks of crests and troughs in each period of surface runout is restricted within a standard value, and the brake rotor is mounted to the wheel mounting flange, thereby eliminating the necessity of mounting of the brake rotor and adjustment of runout after mounting at the customer's factory to provide a reliable automotive wheel bearing assembly.

23 Claims, 21 Drawing Sheets

FIG.16A
FIG.16B
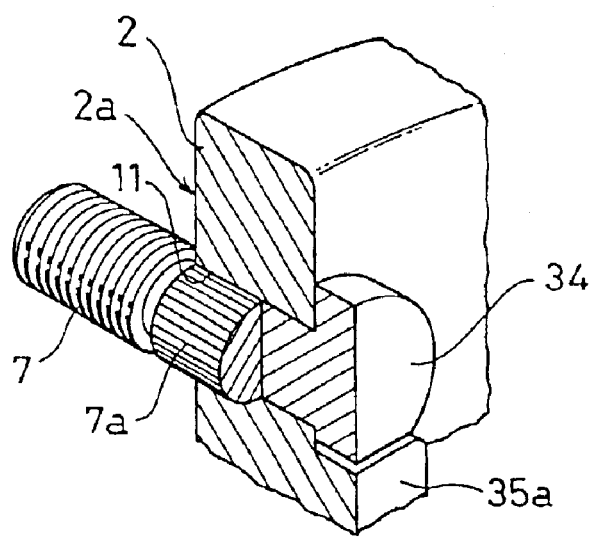
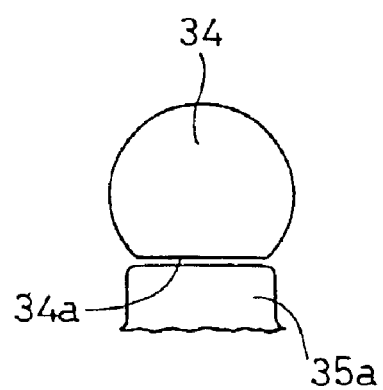
FIG.17A
FIG.17B
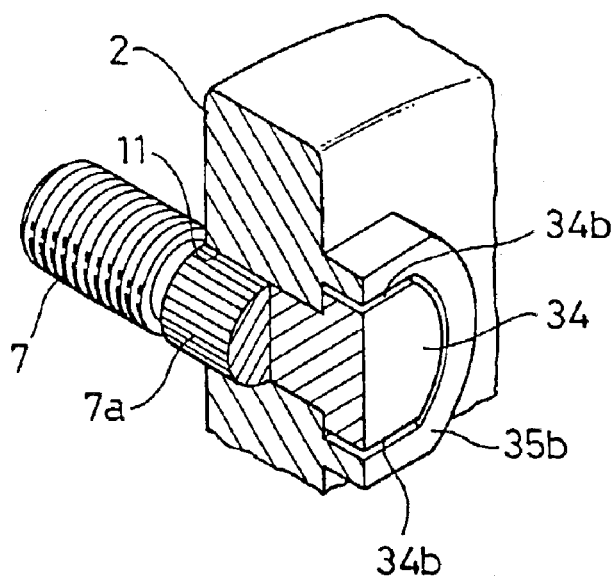
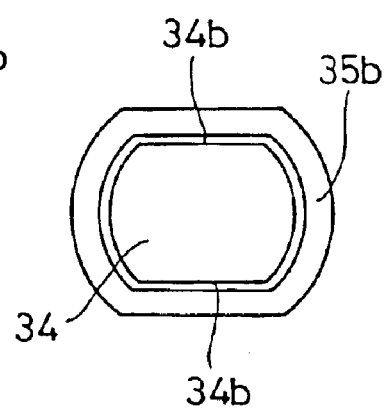

FIG. 18A  FIG. 18B
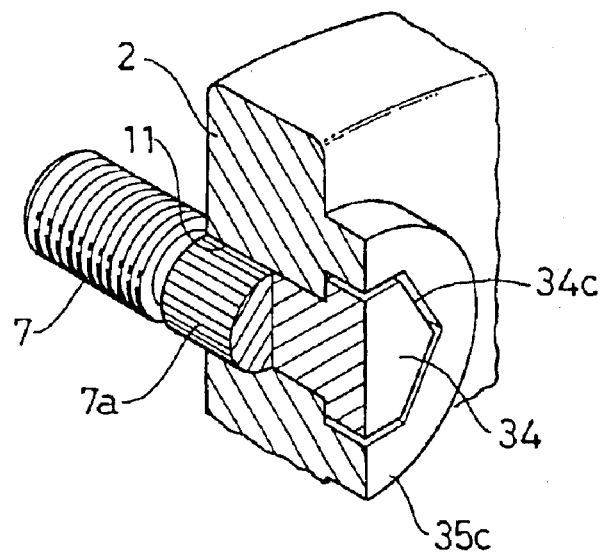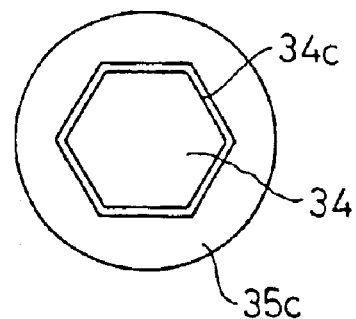
FIG. 19A  FIG. 19B
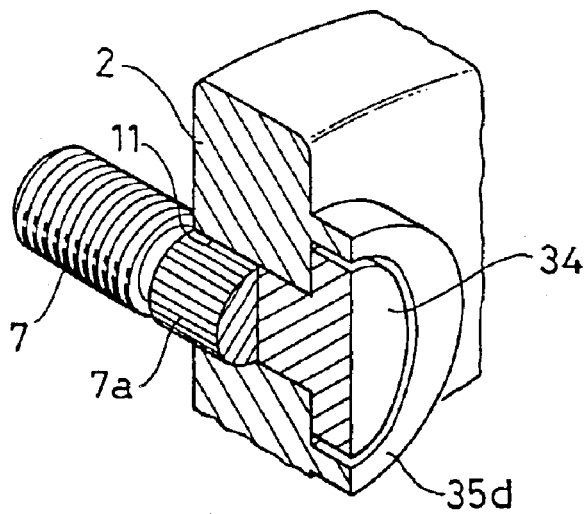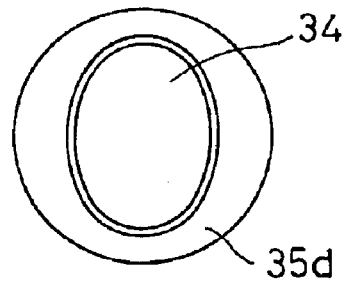

BRAKE ROTOR AND WHEEL BEARING ASSEMBLY HAVING MAXIMUM ACCEPTABLE RUNOUT VARIATION

This is a divisional application of U.S. patent application Ser. No. 09/657,094, filed Sep. 7, 2000, now U.S. Pat. No. 6,575,637.

BACKGROUND OF THE INVENTION

The present invention relates to an automotive brake rotor and a wheel bearing assembly.

Various kinds of wheel bearing assemblies are known including ones for driving wheels and ones for non-driving wheels. FIG. 26 shows a wheel bearing assembly for a driving wheel. It comprises an outer member 3 having two raceways 3a, 3b formed on its inner peripheral surface, an inner member 1 having two raceways 1a, 1b opposite the respective raceways 3a, 3b, and rolling elements or balls 8 disposed between the raceways 3a, 3b on the outer member 3 and the raceways 1a, 1b on the inner member 1 in two rows. The inner member 1 has a flange 2 adapted to be secured to a wheel and is formed with a splined bore 9 into which is inserted a drive shaft.

A brake rotor 5 is positioned by bolts 18 to the outer side 2a of the flange 2 and secured between the outer side 2a and the wheel hub by bolts 7. Any runout of the brake rotor 5 can cause vibrations or squeal during braking, or uneven wear of the brake rotor and/or brake pad.

Brake rotors and wheel bearings are usually delivered to a car manufacturer, who assemble them together. It has been an ordinary practice to adjust to minimize runout of the brake rotor 5 when or after assembling the rotor and the wheel bearing, by e.g. adjusting the angular position of the mounting bolts 7. But such work is troublesome and inefficient.

An object of the invention is to provide a brake rotor and a wheel bearing assembly that are reliable and need no runout adjustment at a car manufacturer.

SUMMARY OF THE INVENTION

According to the invention, a brake rotor is provided which is mounted to a rotary member of a wheel bearing assembly for rotatably supporting a wheel on a vehicle body by means of double-row rolling elements. The maximum runout variation of a mounting surface on the side of the brake rotor abutting the rotary member is restricted within a predetermined value.

By restricting the maximum runout variation of the mounting surface on the side of the brake rotor abutting the rotary member within a predetermined value, runout of the brake rotor mounted to the rotary member is suppressed low within a desired range and troublesome runout adjustment after assembling has become unnecessary.

By restricting the maximum runout variation of a back side of the mounting surface to which a wheel hub is mounted within a predetermined value, it is possible to suppress the runout of the brake rotor.

By restricting it to 50 $\mu$m or less, the brake rotor will be reliable and will not require any runout adjustment after assembly.

By restricting the runout variation per cycle of the mounting surface or its back side within a predetermined value, it is possible to smoothen the runout of the brake rotor.

According to the invention, the runout variation per cycle of the mounting surface should be restricted to 30 $\mu$m or less.

According to the invention, the maximum difference between the peak values of crests or the maximum difference between the peak values of troughs in each runout cycle of the mounting surface or its back side should be restricted within a predetermined value. Thereby it is possible to suppress the runout of the brake rotor to a lower value. The predetermined value should be not more than 30 $\mu$m.

According to the invention, it is preferable that the frequency per rotation of runout of the mounting surface be a multiple of the number of wheel mounting bolts or the number of the mounting bolts be a multiple of the frequency. Thereby it is possible to make uniform the deformation of the brake rotor due to tightening force applied to the mounting bolt and suppress the runout of the brake rotor resulting from the deformation of the brake rotor.

According to the invention, there is provided a wheel bearing assembly comprising an outer member having two raceways on its inner surface, an inner member having two raceways on its outer surface, opposite to the respective raceways on the outer member, and two rows of rolling elements mounted between the opposed raceways, wherein a wheel mounting flange is formed on one of the outer member and the inner member, wherein one side of the wheel mounting flange is a mounting surface for a brake rotor, characterized in that the maximum runout variation of the brake rotor mounting surface is restricted within a predetermined value.

By restricting the maximum variation of runout of the brake rotor mounting surface of the wheel mounting flange within a predetermined value, it is possible to suppress runout of the brake rotor without carrying out troublesome runout adjustment after assembling.

According to the invention, the predetermined value should be 50 $\mu$m and preferably 30 $\mu$m.

By restricting the runout variation per cycle of the brake rotor mounting surface within a predetermined value, it is possible to smoothen the runout of the braking surface of the brake rotor.

By restricting the maximum difference between the peak values of crests or the maximum difference between the peak values of troughs in each cycle of runout of the brake rotor mounting surface within a predetermined value, it is possible to suppress the runout of the braking surface of the brake rotor.

It is preferable that the frequency per rotation of runout of the brake rotor mounting surface be a multiple of the number of wheel mounting bolts or the number,of the wheel mounting bolts be a multiple of the frequency. Thereby it is possible to make uniform the deformation of the brake rotor due to tightening force applied to the mounting bolt and suppress the runout of the brake rotor resulting from the deformation of the brake rotor.

Also, in the arrangement in which the brake rotor mounting surface is the outer side of the wheel mounting flange, by inclining this side outwardly toward the tip of the wheel mounting flange, when the brake rotor and the wheel hub are superposed and tightened by wheel mounting bolts, the wheel mounting flange is resiliently deformed, so that the outer peripheral portion of the brake rotor mounting surface is pressed hard against the brake rotor. Thus, the brake rotor is stably supported by the outer peripheral portion. In this case too, by also restricting the maximum runout variation of the brake rotor mounting surface within a predetermined value, it is possible to suppress runout of the braking surface during rotation of the brake rotor.

The inclination angle of the brake rotor mounting surface is preferably 20° or less. If this angle is greater than needed, even if the wheel mounting flange is resiliently deformed, the inner peripheral portion of the brake rotor may become out of contact with the brake rotor mounting surface, so that the mounting of the brake rotor becomes unstable. The upper limit of the inclination angle that will not become unstable is determined at 20°.

By setting the degree of flatness and circumferential flatness of the outer peripheral portion of the brake rotor mounting surface at 30 μm or less, it is possible to suppress runout of the braking surface during rotation of the brake rotor pressed hard against the outer peripheral portion.

As shown in FIG. 25A, the circumferential flatness is measured as described below. The wheel mounting flange 2 is rotated with the probe of a measuring device such as a dial gauge 22 in contact with the outer peripheral portion of the side 2a, which is the brake rotor mounting surface of the wheel mounting flange 2. FIG. 25B is a graph showing undulation picked up by the probe of the dial gauge. The circumferential flatness is the minimum distance δ between two parallel lines L1 and L2 between which the undulation is contained.

The wheel mounting flange may be formed integrally with the outer member or the inner member.

By mounting the above-mentioned brake rotor with less runout on the brake rotor mounting surface, the runout of the braking surface of the brake rotor during rotation can be suppressed.

According to the present invention, there is also provided a wheel bearing assembly comprising an outer member having two raceways on its inner surface, an inner member having two raceways on its outer surface so as to be opposite to the two raceways on the outer member, and two rows of rolling elements mounted between the opposed raceways, a wheel mounting flange being formed on the inner member, characterised in that a brake rotor is integrally formed on the wheel mounting flange.

By forming a brake rotor integrally with the wheel mounting flange, the mounting of the brake rotor and runout adjustment after assembly can be eliminated.

By restricting the maximum runout of the braking surface of the brake rotor below a predetermined value, the runout of the braking surface of the brake rotor during rotation can be suppressed without the need of troublesome runout adjustment by the customer.

The predetermined value should be 100 μm or preferably 50 μm.

If the wheel mounting flange is mounted on the inner member, a drive shaft may be mounted in the inner member, or the inner member may be formed integrally with an outer coupling of a constant-velocity joint.

The inner member may comprise a first inner member having an outboard raceway and a second inner member having an inboard raceway, and the second inner member may be an outer coupling or spindle of a constant-velocity joint.

By inseparably coupling the first and second inner members together by deformation, no nuts are needed and a smaller number of parts, smaller weight and smaller axial length of the assembly are achieved.

By forming a dimension-controlled negative axial clearance between the rolling elements and the raceways, it is possible to provide a wheel bearing assembly high in rigidity, and in a state assembled in a vehicle body, while the vehicle is turned, it is possible to prevent the member on the side having the wheel mounting flange from inclining toward the member on the fixed side to eliminate uneven contact between the brake rotor mounted to the wheel mounting flange and the brake pads, thus preventing uneven wear of both of them. Thus, coupled with the effect by restricting the maximum variation of runout of the brake rotor mounting surface within a predetermined value, it is possible to suppress runout of the braking surface during rotation of the brake rotor.

At least one of the two raceways on the inner member may be formed on a separate raceway member fixed to the inner member. This facilitates control of the axial clearance between the rolling elements and the raceways.

By inseparably coupling the inner member and the separate raceway member together by plastic deformation, no nuts are needed and a smaller number of parts, smaller weight and smaller axial length of the assembly are achieved.

According to this invention, there is provided a wheel bearing assembly wherein one of the outer member and the inner member that carries the wheel mounting flange is rotatable and the other is nonrotatable and wherein the outer member and inner member defines an annular space therebetween in which are disposed rolling elements. The wheel bearing assembly further comprises a slinger fixed to the one of the outer and inner members, seal members for sealing both sides of the annular space, an encoder having multiple magnetic poles and fixed to the slinger, a sensor for sensing fluctuations in the magnetic flux produced by the encoder when the encoder rotates and for producing a signal indicative of the revolving speed of the encoder, and a rotational speed detector for receiving the signal and for calculating the revolving speed of the one member based on the signal.

In comparison with the arrangement in which a rotational speed detector is separately provided, a compact and lightweight assembly is provided with a greater freedom of design.

According to this invention, there is also provided a wheel bearing assembly wherein the wheel mounting flange is fastened to a brake rotor by bolts inserted through bolt holes formed in the flange, the wheel bearing assembly further comprising arrangements for preventing the bolts from turning in the respective bolt holes.

This reduces the surface pressure between serrations formed at the neck of the bolt and the inner wall of the bolt hole and thus prevents strains from producing on the side of the flange on which the brake rotor is mounted.

The arrangement for preventing the bolts from turning may comprise a bolt head having a noncircular cross-section, and a protrusion formed on the wheel mounting flange near each of the bolt holes and engaging the head to prevent the each bolt from turning in the bolt hole.

The noncircular head may have a flat side face formed thereon, or have a knurled surface, or an oval cross-section.

The protrusions may be pressed against the respective heads by plastic deformation.

BRIEF DESCRIPTION OF THE DRAWINGS

FIG. 16A is a partially cutaway perspective view of the wheel mounting bolt at its head portion;

FIG. 16B is a front view thereof;

FIGS. 17A to 19A are similar views to FIG. 16A of modified embodiments of the wheel mounting bolt at their head portion;

FIGS. 17B to 19B are front views thereof;

DETAILED DESCRIPTION OF THE PREFERRED EMBODIMENTS

The embodiments are described with reference to FIGS. 1–25.

Figure 1:
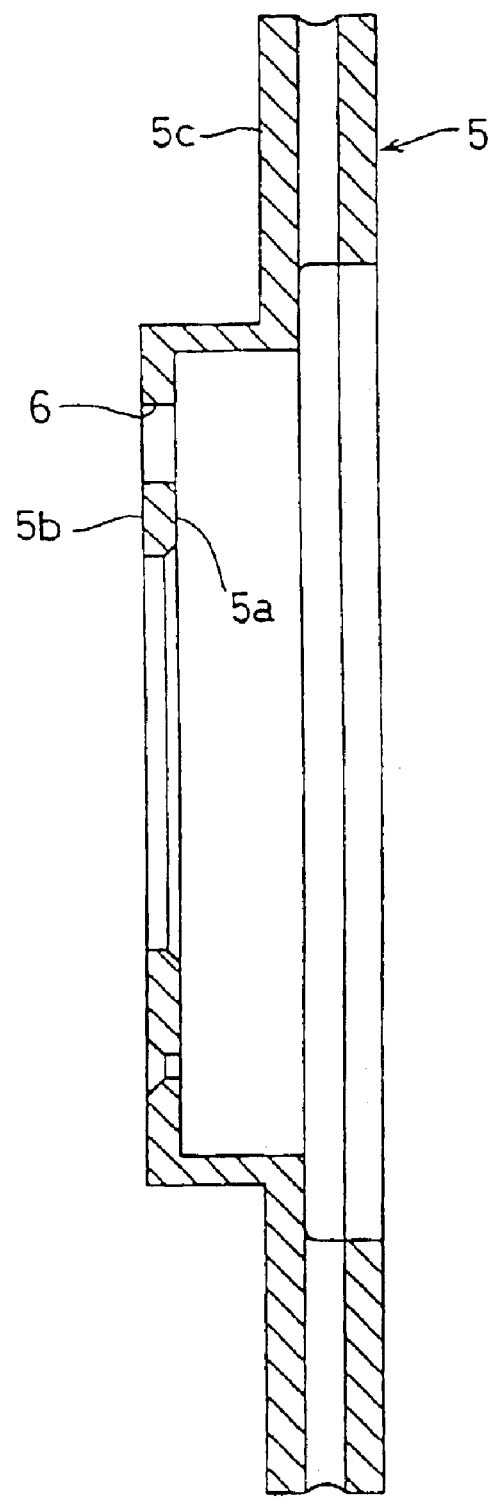
FIG. 1 is a vertical sectional view showing a brake rotor of a first embodiment.
Figure 2:
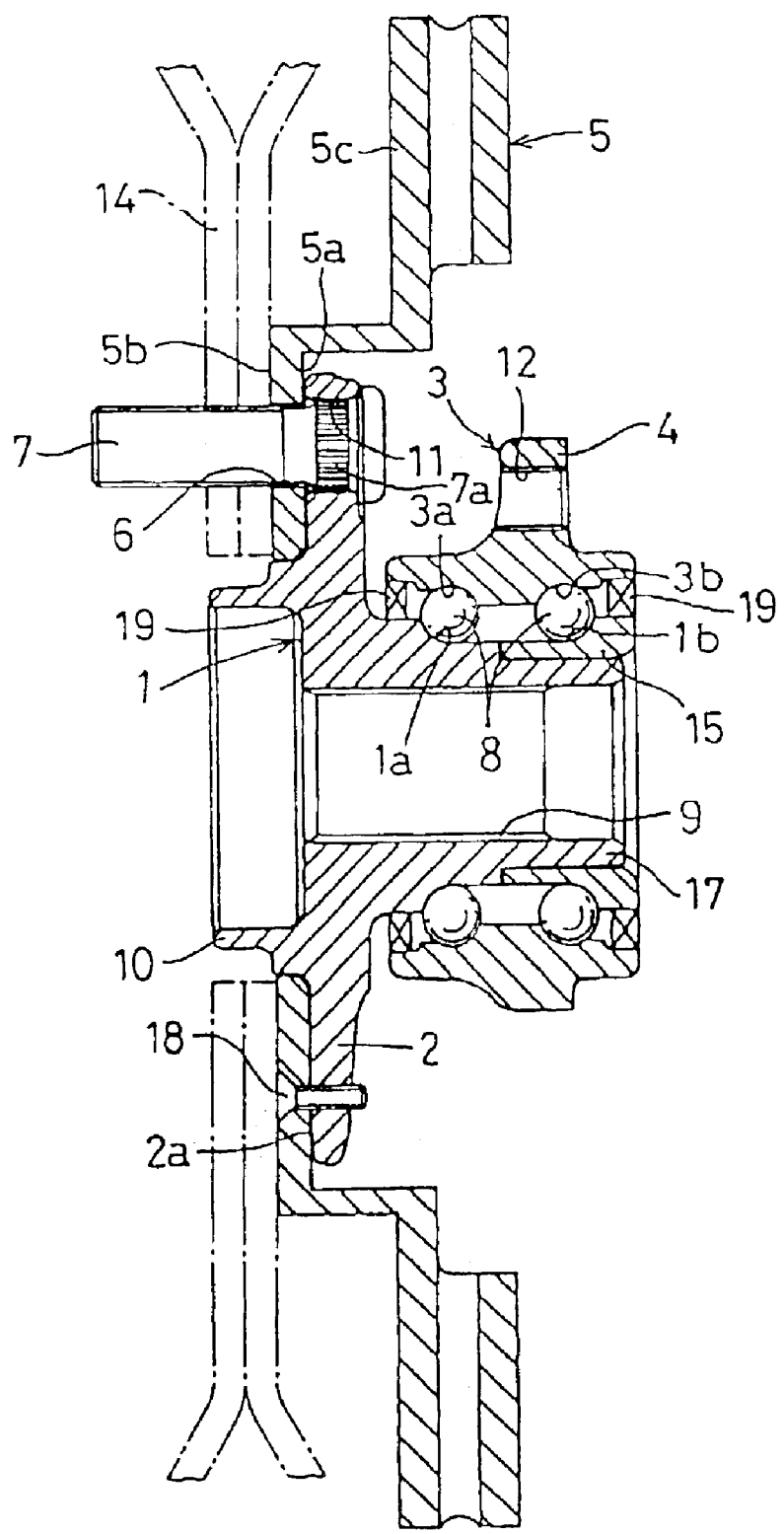
FIG. 2 is a vertical sectional view showing a wheel bearing assembly of a first embodiment on which is mounted the brake rotor of FIG. 1.
Figure 26:
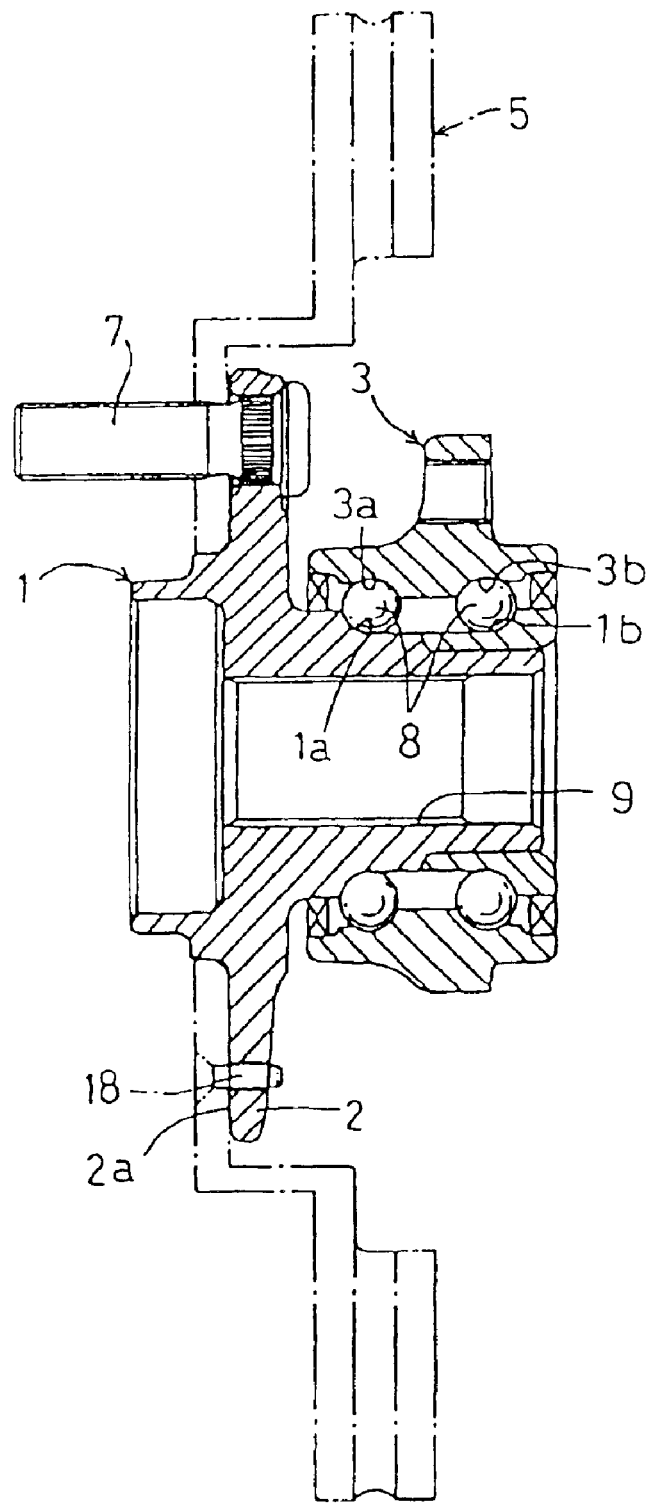
FIG. 26 is a vertical sectional view showing a conventional wheel bearing assembly.

FIGS. 1 and 2 show a first embodiment. FIG. 1 shows a brake rotor 5 embodying the present invention. FIG. 2 shows a wheel bearing assembly embodying the invention with the brake rotor 5 mounted thereon. Elements identical or similar to those of FIG. 26 are denoted by the same numerals.

The wheel bearing assembly of FIG. 2 is for a driving wheel. It has an inner member 1 formed with a splined bore 9 in which is received a drive shaft. The inner member 1 is further formed with an integral wheel mounting flange 2 extending radially outwardly from its outer surface, and a wheel pilot 10 axially protruding from its outer end face. The wheel bearing assembly further includes an outer member 3 having a flange 4 formed with bolt holes 12 through which bolts are inserted to secure the outer member to a stationary part of the vehicle body.

A brake rotor 5 is positioned by bolts 18 with its side face 5a against an outer side 2a of the flange 2. It is secured in position between the flange 2 of the wheel bearing assembly and a wheel hub 14 by bolts 7 inserted through bolt holes 6 and 11 formed in the rotor 5 and the flange 2, respectively, with its back and front sides 5a, 5b pressed against the outer side 2a of the flange 2 and the inner side of the hub 14, respectively. The wheel mounting bolt 7 is prevented by serrations 7a from turning in the hole 11 formed in the wheel mounting flange 2.

The inner member 1 comprises a main portion formed with a first raceway 1a on its outer surface, and a separate ring member 15 press-fitted on a stepped or recessed portion of the main portion and formed with a second raceway 1b on its outer surface. The outer member 3 has two raceways 3a and 3b directly formed on its inner surface so as to be opposite the raceways 1a and 1b on the inner member 1. Rolling elements or balls 8 are received between the respective opposed pairs of raceways 1a, 1b and 3a, 3b. Seal members 19 are provided at both axial ends of the space in which the balls 8 are retained to seal this space.

For the material of the inner member 1 and outer member 3, a carbon steel is used, the carbon content of which is 0.45–1.10 wt %, preferably 0.45–0.75 wt %. Its surface is treated by induction hardening, carburizing hardening or laser hardening so that the surface hardness will be about Hv 500–900. The depth of the hardened layer is about 0.7–4.0 mm at portions where the raceways 1a, 3a, 3b are formed and about 0.3–2.0 mm at other portions.

Figure 3:
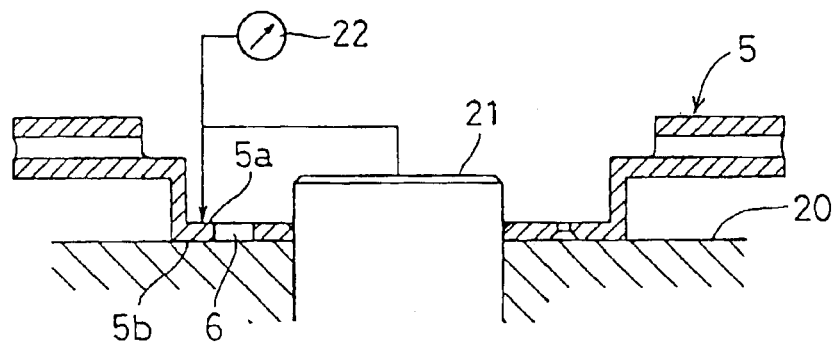
FIG. 3 is a vertical sectional view showing how the runout of a mounting surface of the brake rotor of FIG. 1 was measured.

FIG. 3 shows how the runout of the mounting side 5a of the brake rotor 5 was measured. The rotor 5 was placed on a rotary table 20 with its mounting side 5a up and a boss 21 was received in the center hole of the rotor. The table 20 was then turned 360° and the runout was measured by use of a dial gauge 22 fixed to the boss 21. Then, the rotor 5 was turned upside down and the runout was measured for the reverse side 5b in the same manner as above. Since the runout is greater at the radially outer portion of the rotor, the runout was measured at central points between the outer edge of the side 5a and the circle circumscribing the bolt holes 6 for more strict runout control.

Figure 4:
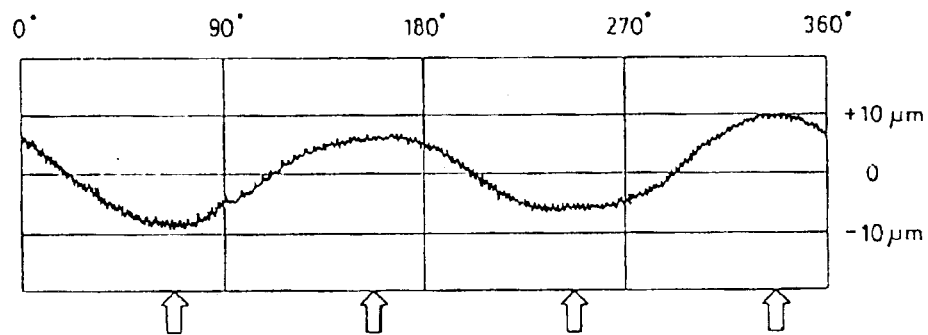
FIG. 4 is a graph showing the measuring results of runout of FIG. 3.

FIG. 4 shows the runout curve of the side 5a thus measured. The maximum runout variation in the entire 360° interval and the maximum variation in any one-cycle interval are both 20 $\mu$m, which are smaller than the standard values determined for these parameters, i.e. 50 $\mu$m and 30 $\mu$m, respectively. The curve has a frequency of two per rotation of the rotor and thus has two crests (local maximums) and troughs (local minimums) for each 360°. As shown, the difference between the largest and smallest local maximums is 4 $\mu$m while the difference between the largest and smallest local minimums is 3 $\mu$m. These values are far smaller than 30 $\mu$m, which is a standard value determined for these parameters.

In this embodiment, the rotor is secured in position by four mounting bolts 7. The arrows in FIG. 4 show the positions of the wheel mounting bolts 7, which correspond to the positions of the crests of runout of the side 2a. But this is not a must. Although not shown, the runout curve of the side 5b was almost the same as that of the side 5a shown in FIG. 4. In other words, the frequency was two and the difference between the largest and smallest local maximums, the difference between the largest and smallest local minimums, and the maximum variation in any one-cycle were the same with the side 5a. Those were smaller than the respective standard values.

From FIG. 4, it will be apparent that the maximum variation in the entire 360° interval of the runout curve and the maximum variation in any one-cycle interval are equal to each other if the runout curve has a runout frequency of two or less as shown in FIG. 4. The former is not equal to but larger than the latter if the runout frequency is 3 or over.

Figure 5:
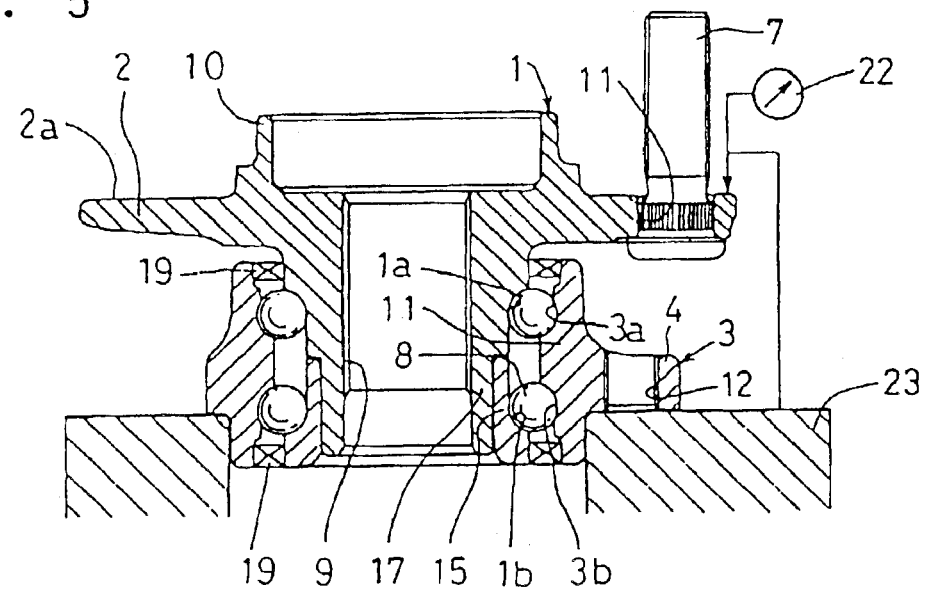
FIG. 5 is a vertical sectional view showing how runout of a side of the wheel mounting flange was measured.

FIG. 5 shows how the runout of the outer side 2a of the flange 2 of the wheel bearing assembly was measured. The wheel bearing assembly with the rotor not mounted was mounted with the outer member 3 fixed to a bench 23 so that the inner member 1 be rotatable. In this state, the inner member 1 with the wheel mounting flange 2 was turned 360° and the runout of the side 2a of the flange 2 was measured by a dial gauge 22. Since its runout, too, is greater at the radially outer portion of the flange, the runout was measured at central points between the outer edge of the flange 2 and the cicumcircle of the bolt holes 11 for more strict runout control.

Figure 6:
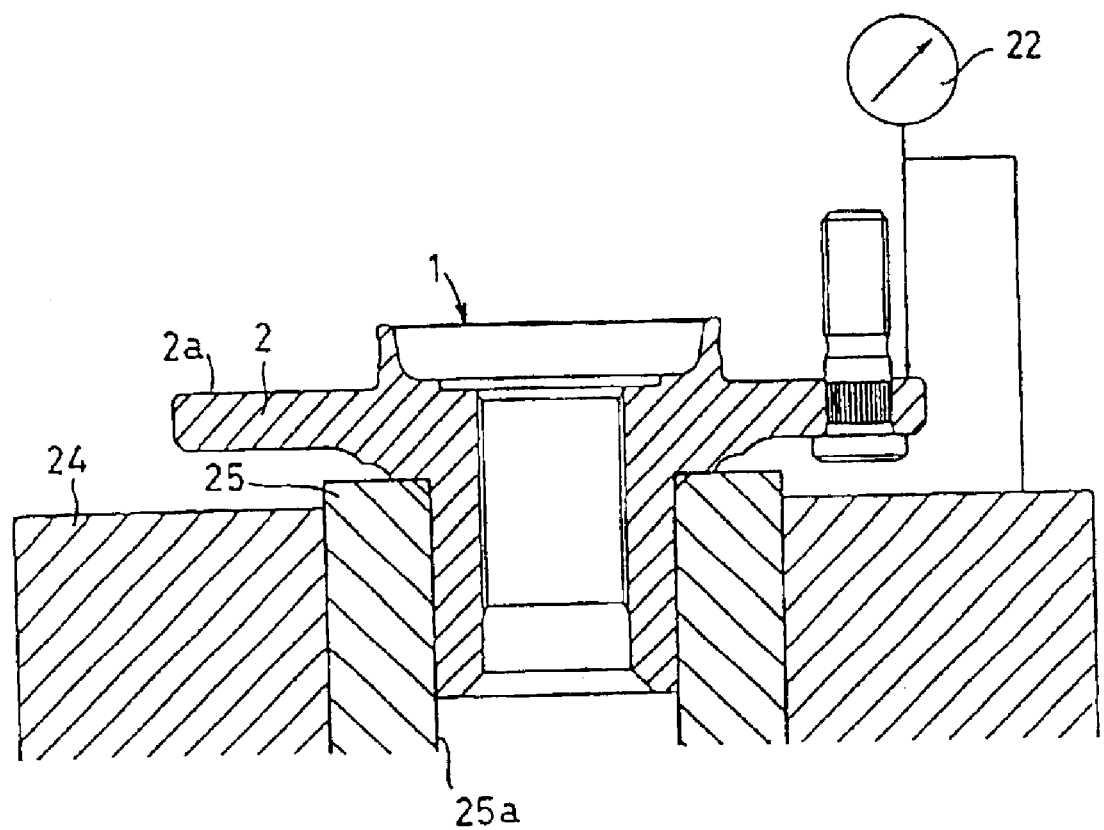
FIG. 6 is a vertical sectional view showing a modified measuring method.

The runout of side 2a may be measured with the inner side of the inner member 1 fitted and positioned in a hole 25a of a rotary ring 25 mounted on a measuring stand 24 as shown in FIG. 6, and by turning the rotary ring 25 together with the inner member 1 by one full turn. The runout was measured by means of a dial gauge 22 fixed to the measuring stand 24.

Figure 7:
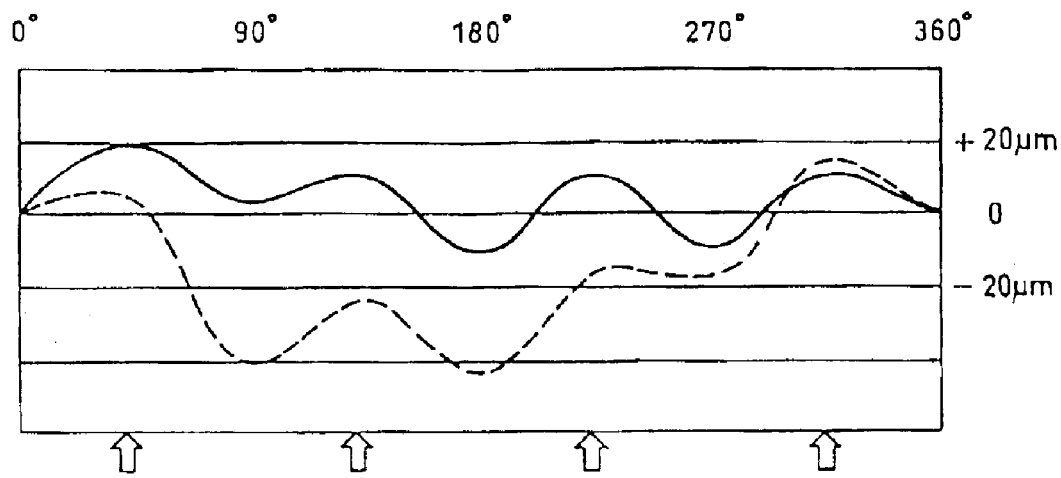
FIG. 7 is a graph showing the measuring results of runout of FIG. 5.

FIG. 7 shows the runout curve (solid line) of the side 2a thus measured and a similar runout curve (dotted line) for another wheel bearing assembly as a comparative example which will be described later. Both curves have a frequency of four per rotation of the rotor and thus have four crests (local maximums) and troughs (local minimums). The maximum variation in one-cycle interval of the runout curve and the maximum variation in the entire 360° interval are 25 μm and 35 μm, respectively, which are smaller than standard values for these parameters, i.e. 30 μm and 50 μm, respectively. As shown, the difference between the largest and smallest local maximums is 10 μm while the difference between the largest and smallest local minimums is 15 μm. Thus, these values are far smaller than 30 μm, which is a standard value for these parameters. The arrows in FIG. 7 show the positions of the wheel mounting bolts 7, which correspond to the positions of the crests of runout of the side 2a.

Figure 8:
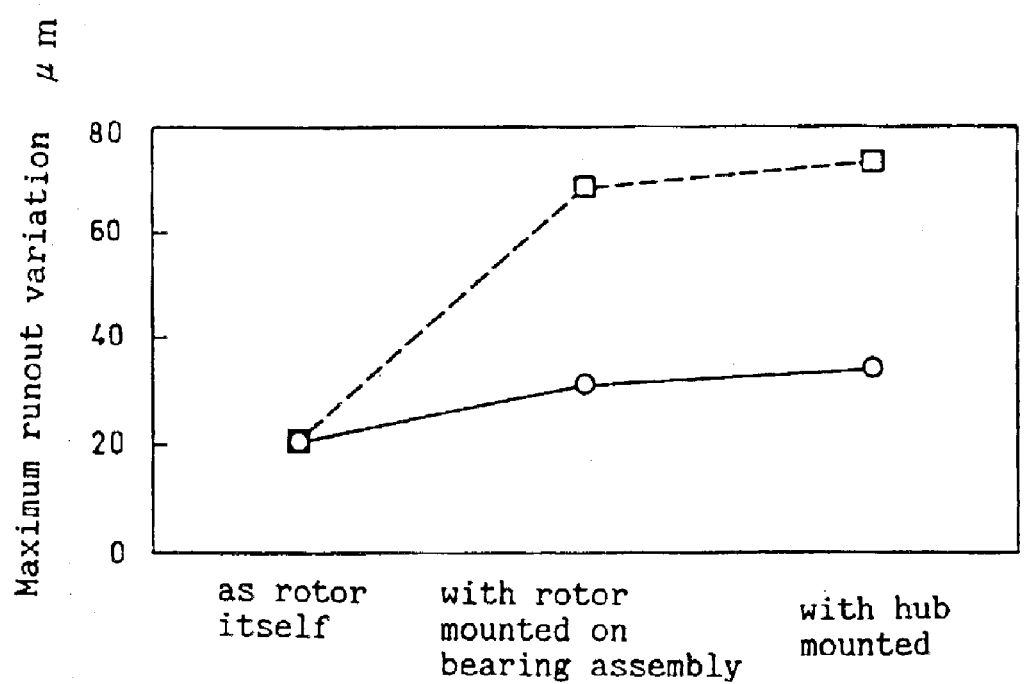
FIG. 8 is a graph showing the measuring results of runout when the brake rotor of FIG. 1 was mounted to the wheel bearing assembly of FIG. 2.

FIG. 8 is a graph showing the maximum runout variations when runout was measured with the brake rotor 5 having runout characteristics shown in FIG. 7 mounted on the flange 2 of the wheel bearing assembly and when it was measured with not only the brake rotor but the wheel hub 14 mounted on the side 5b of the brake rotor 5. The solid line is for the wheel bearing assembly embodying the present invention and the dotted line is for the comparative example of wheel bearing assembly. The runout was measured at outer side of the surface 5c of the rotor against which the brake pad is pressed.

As will be apparent from these results, while the maximum runout variation of the rotor alone was about 20 μm, this value jumped up to about 70 μm when the rotor was mounted to the comparative example of the wheel bearing assembly and exceeded 70 μm when the wheel hub was further mounted. In contrast, this value was suppressed to about 35 μm even when the rotor was mounted to the wheel bearing assembly of the invention and further the wheel hub was mounted. This clearly shows that with the brake rotor and the wheel bearing assembly embodying the present invention, it is possible to reduce the runout of the rotor drastically in an actual travel situation.

In the second to ninth embodiments which will be described below, the difference between the largest and smallest local maximums, the difference between the largest and smallest local minimums, and the maximum variation in any one-cycle interval and the maximum variation in the entire 360° interval were measured for the front and back sides 5a, 5b of the rotor 5 and the side 2a of the flange 2. These values, though not shown, were all smaller than the respective standard values except for the back side 5b of the rotor 5 in the fourth embodiment. The frequency of runout per rotation was a multiple of the number of the mounting bolts 7. Or the latter was a multiple of the former.

In the description of the embodiments shown in FIGS. 9–25, like elements are denoted by like numerals as in FIG. 2.

Figure 9:
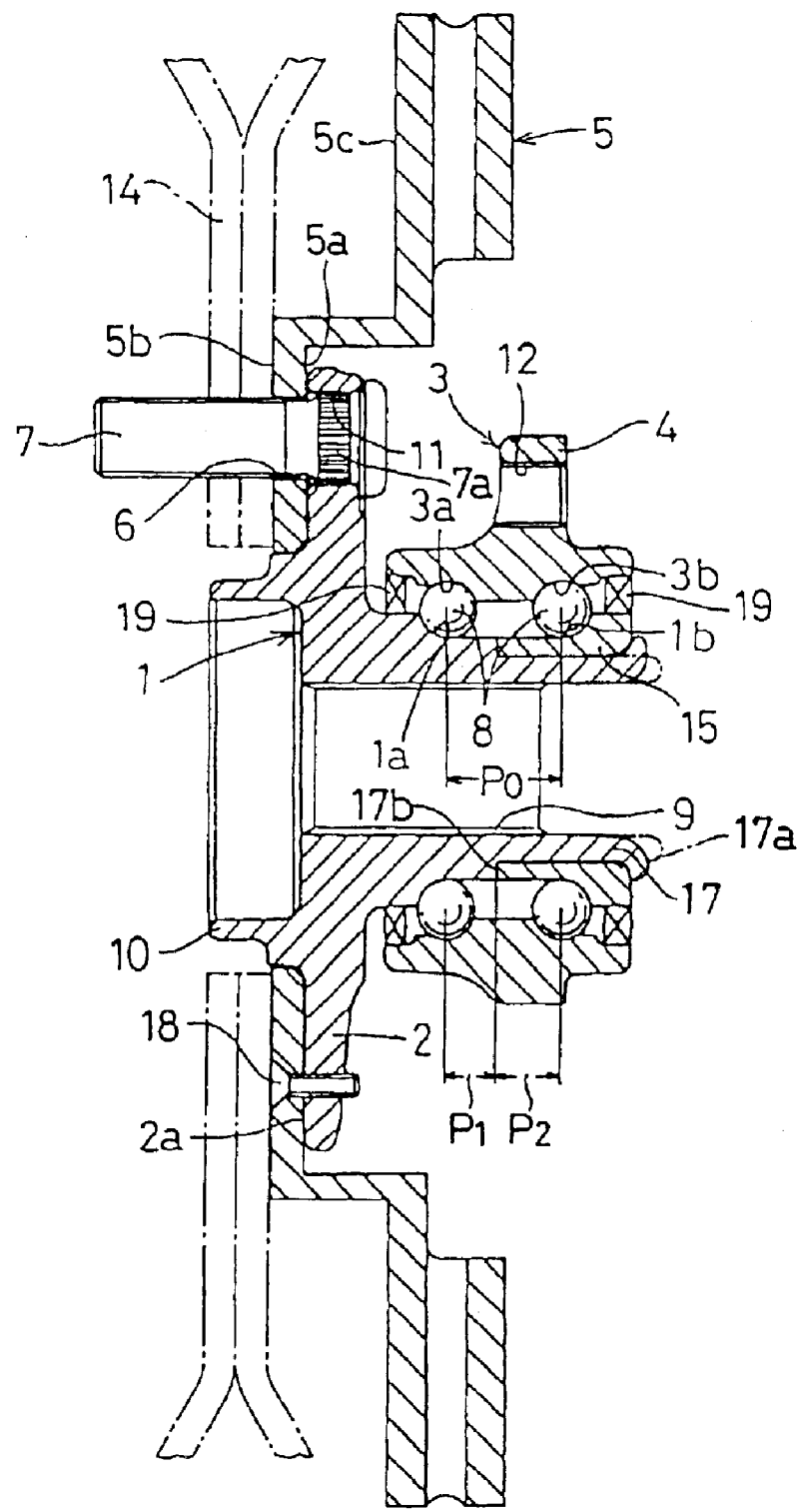
FIG. 9 is a vertical sectional view showing a wheel bearing assembly of a second embodiment.

FIG. 9 shows a second embodiment. This wheel bearing assembly is for a driving wheel and a dimension-controlled negative axial clearance is formed between the rolling elements 8 and the raceways 1a, 1b, 3a, 3b. With the inner ring 15 pressed on the stepped portion 17 of the inner member 1 with a negative axial clearance, the inner end 17a of the stepped portion 17 is plastically deformed by caulking to hold the ring 15 in this state. Otherwise, this embodiment is structurally the same as the first embodiment.

In bearing machining steps, the negative axial clearance can be set to a desired value by controlling the pitch P0 between the raceways 3a, 3b on the outer member 3, and the distance P1 to the center of the outer raceway 1a and the distance P2 to the center of the inner raceway 1b from a boundary position 17b of the stepped portion 17 into which the inner member 15 is pressed on the outer periphery of the inner member 1, and by selecting them so that the relation P0>P1+P2 is established.

Figure 10A:
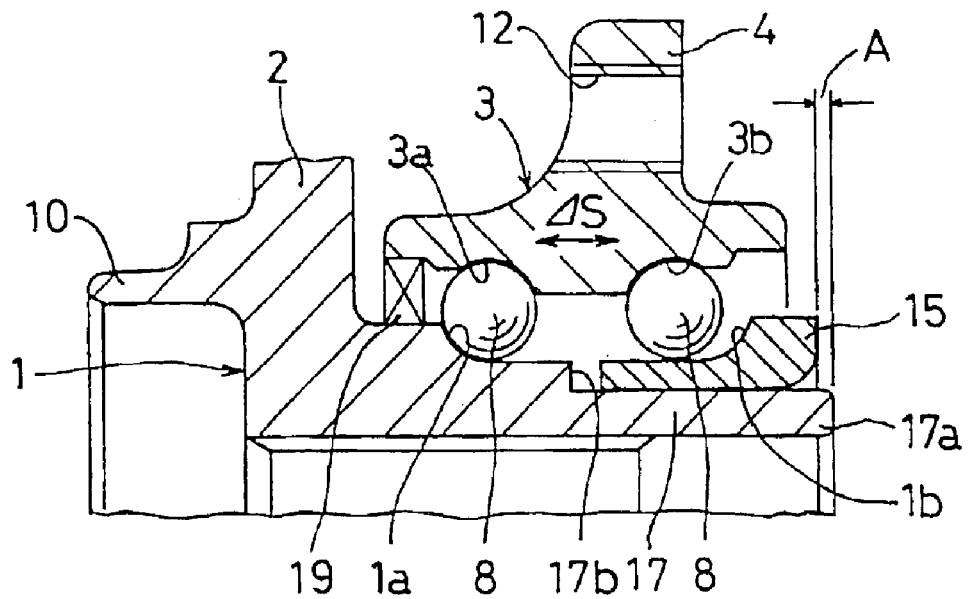
FIGS. 10A, 10B are partial enlarged sectional views showing a method of measuring an axial clearance of the wheel bearing assembly of FIG. 9.

Specifically the setting and control of the negative axial clearance can be carried out in the following steps. First, as shown in FIG. 10A, the inner ring 15 is pressed into the stepped portion 17, the end 17a of which has not been plastically deformed, and stopped temporarily. In the stopped state, the outer member 3 is axially reciprocated to measure the moving stroke ΔS.

Figure 10B:
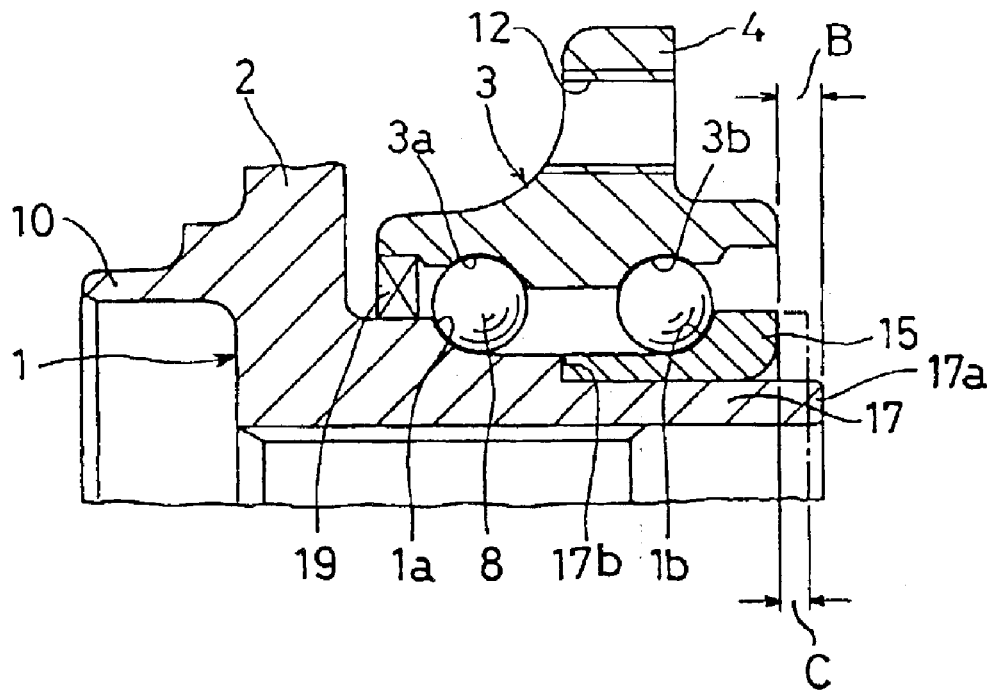

Next, as shown in FIG. 10B, the inner ring 15 is pressed until the end face of the inner ring 15 abuts the boundary position 17b of the stepped portion 17, and the press-in stroke C is measured. The difference (ΔS−C) between the measured values of the moving stroke ΔS and the press-in stroke C is the set axial clearance, and this value is controlled to a desired negative value.

The press-in stroke C can be measured by making the inner end 17a of the recessed portion 17 (before plastic deformation) as a reference surface and measuring the distance A from the reference surface to the inner end face of the inner ring 15 and the distance B from the reference surface to the inner end face of the inner ring after completion of pressing in FIG. 10B and deducting B from A (C=B−A).

The inner member 1 is made of carbon steel and hardened to a surface hardness Hv of about 500–900 like in the first embodiment except the end 17a of the recessed portion 17, which is not hardend and has a surface hardness Hv of about 200 to 300 so that this portion is ductile enough to be plastically deformable.

Figure 11:
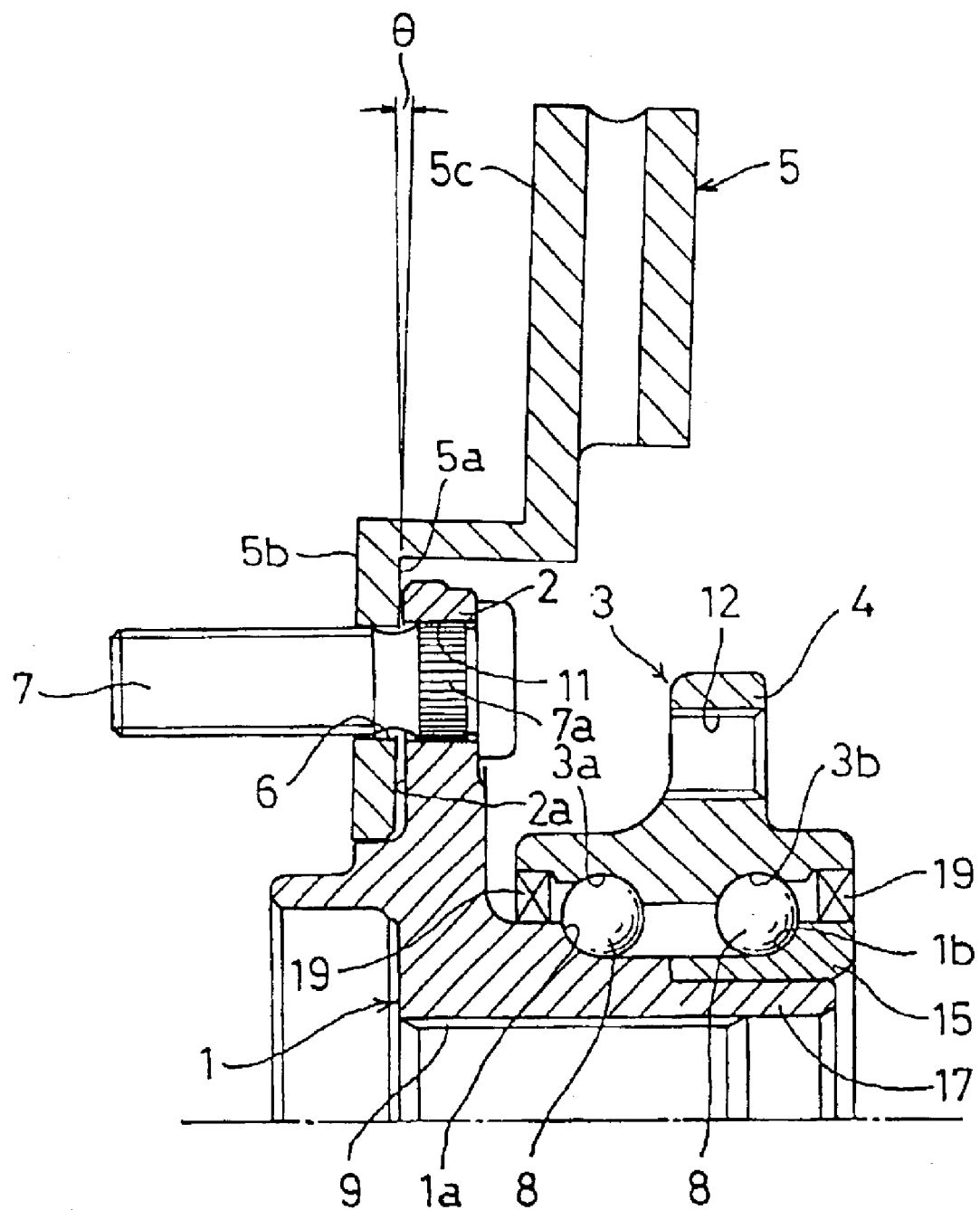
FIG. 11 is a vertical sectional view showing the wheel bearing assembly of a third embodiment.

FIG. 11 shows a third embodiment. This wheel bearing assembly is also for a driving wheel and of the same structure as the first embodiment. The outer side 2a of the wheel mounting flange 2 to which is mounted the brake rotor 5 is formed slightly inclined by the inclination angle θ to the outer side toward the tip of the wheel mounting flange 2. In this embodiment, the inclination angle θ is set at 10°.

Figure 12:
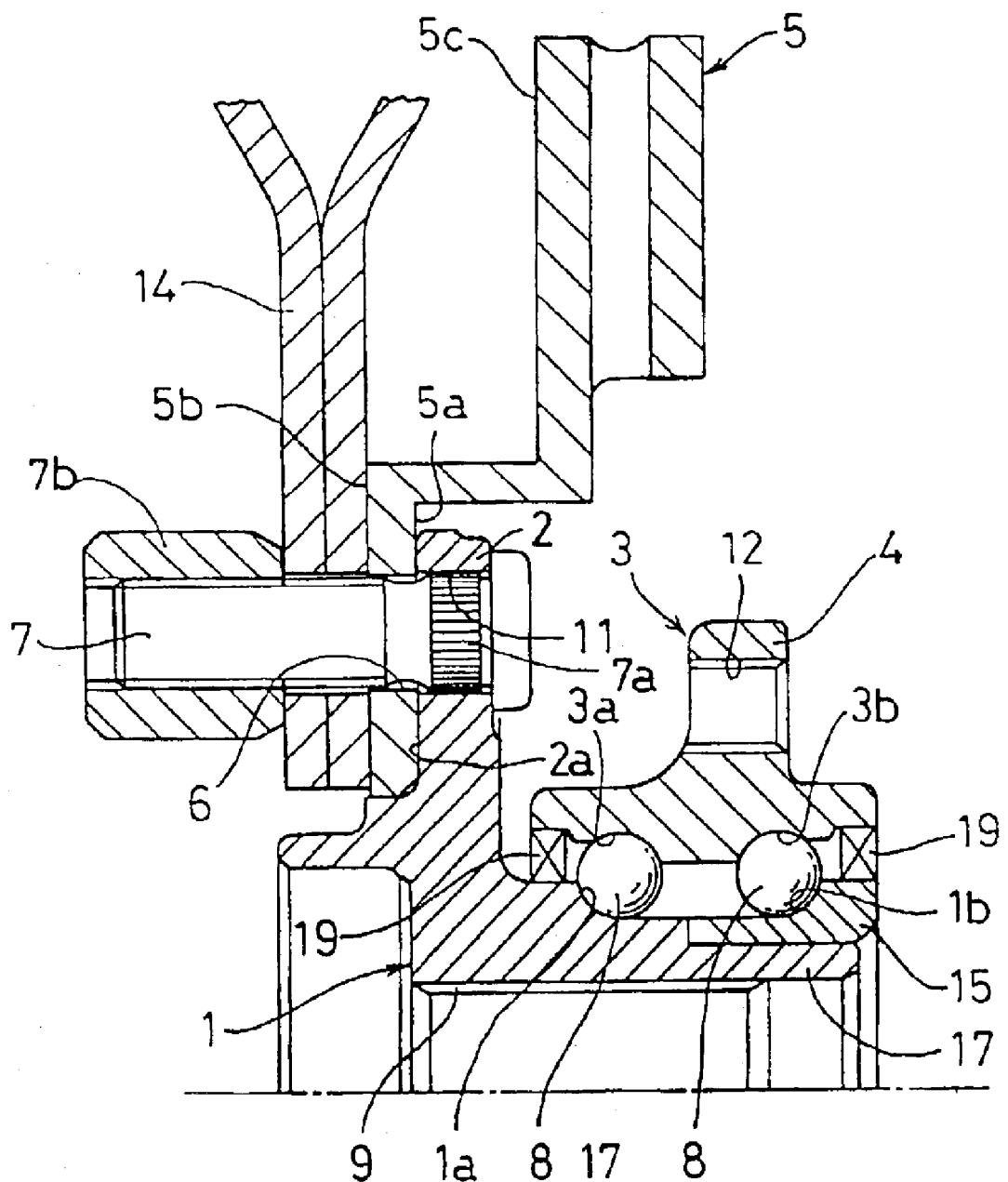
FIG. 12 is a vertical sectional view showing a wheel hub fastened to the wheel bearing assembly of FIG. 11.

As shown in FIG. 12, when the brake rotor 5 and the wheel hub 14 are superposed to the side 2a and fastened by wheel mounting bolts 7 and nuts 7b to the wheel mounting flange 2 with a predetermined tightening torque, the wheel mounting flange 2 is subjected to elastic deformation, so that the outer peripheral portion of the side 2a, which is the brake rotor mounting surface, is pressed hard against the brake rotor 5. Thus, the brake rotor is stably supported by the outer peripheral portion. Coupled with the effect by restricting the maximum variation of runout of the side 2a, this makes it possible to suppress: runout of the braking surface 5c during rotation of the brake rotor 5.

If the inclination angle θ is greater than necessary, even if the wheel mounting flange 2 is resiliently deformed, the inner peripheral portion of the brake rotor 5 will be out of contact with the side surface 2a, so that the mounting of the brake rotor becomes unstable. Thus, the inclination angle θ should preferably be not more than 20°.

The degree of flatness and the circumferential flatness of the outer peripheral portion of the side 2a of the flange 2 should be both 30 μm or less to suppress runout of the braking surface 5c during rotation of the brake rotor 5 which is pressed hard against the outer peripheral portion.

Figure 13:
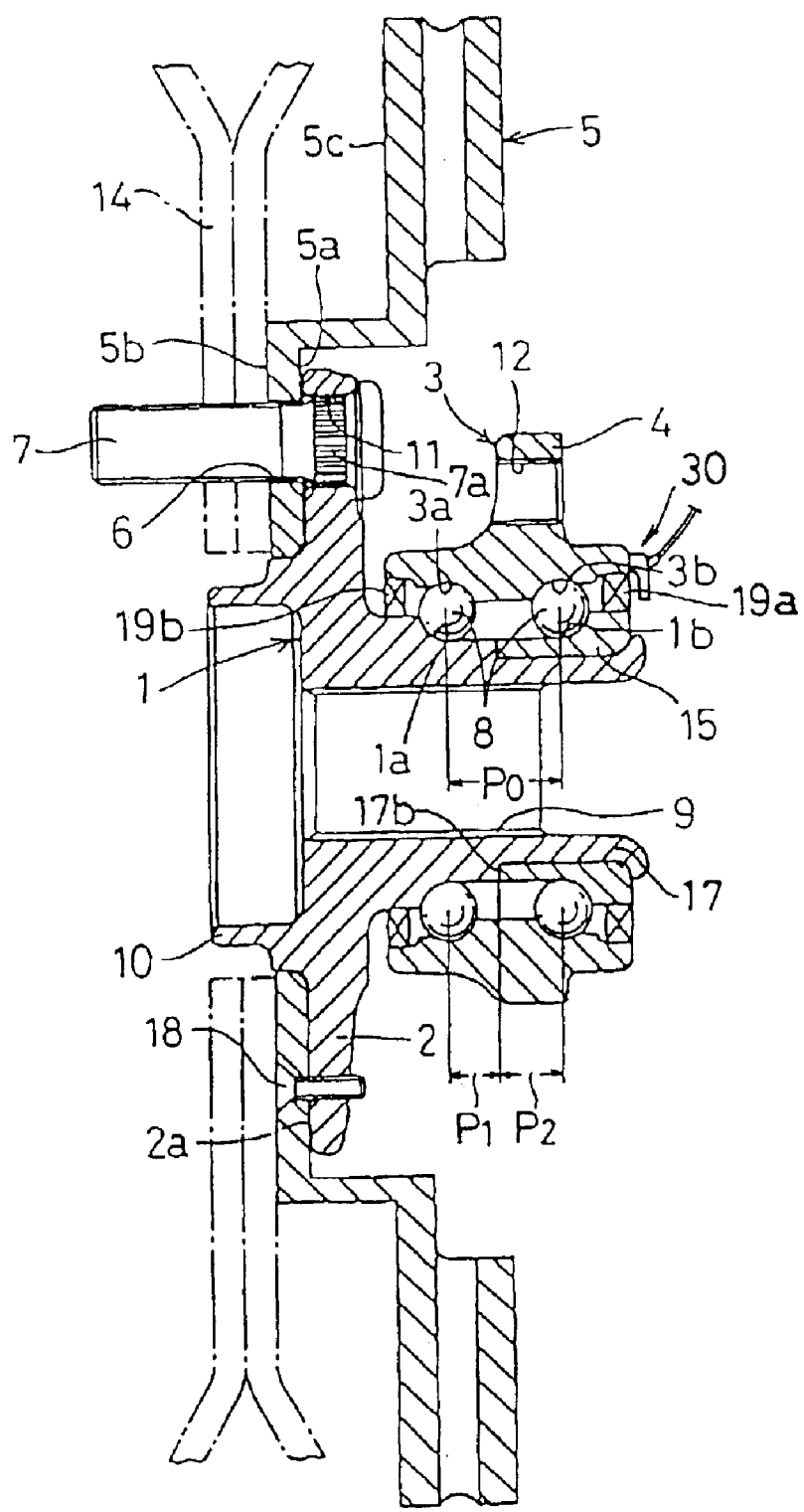
FIG. 13 is a vertical sectional view showing a wheel bearing assembly of a fourth embodiment.
Figure 14A:
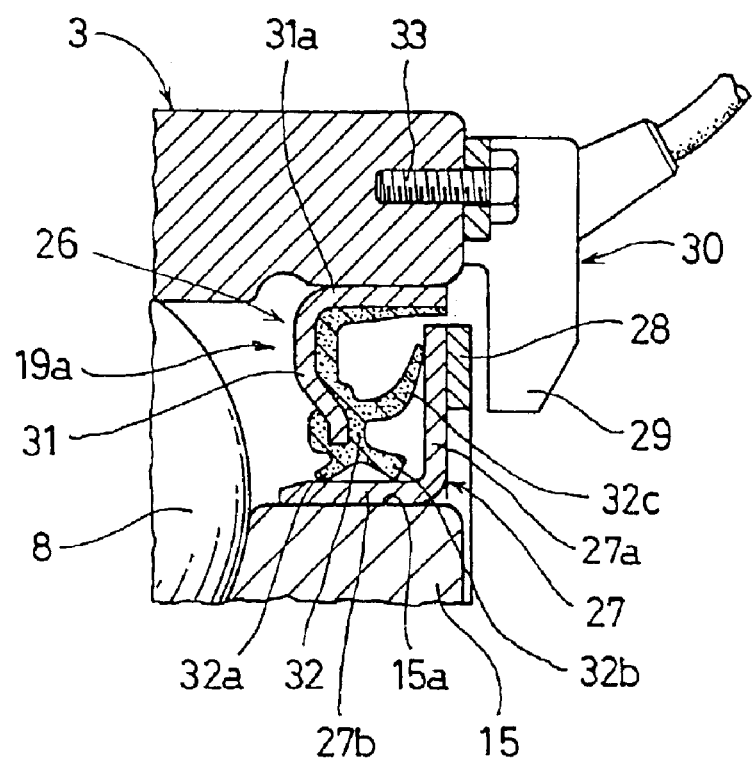
FIG. 14A is an enlarged sectional view of the rotation speed detector of the assembly of FIG. 13.

FIG. 13 shows a fourth embodiment, which is also a wheel bearing assembly for a driving wheel. It includes a seal member 19a for sealing the inner side of the annular space in which are housed rolling elements 8. As shown in FIG. 14A, the seal member 19a comprises a seal ring 26 mounted to the outer member 3, which is fixed, and a slinger 27 fixed to the rotating inner member 1. The slinger 27 comprises a cylindrical portion 27b pressed on the land 15a of the inner ring 15, and a radial flange 27a extending radially outwardly from the inboard end of the cylindrical portion 27b.

This bearing assembly further includes a wheel speed detector 30 comprising a multi-polarized encoder 28 mounted on the outer surface of the radial flange 27a of the slinger 27, and a sensor 29 fixed to the inboard end of the outer member 3, opposite the encoder 28 to detect any change in magnetic flux. The outboard side of the bearing annular space is also sealed by a seal member 19b similar to the seal member 19a. Otherwise, this embodiment is structurally the same as the second embodiment.

As shown in FIG. 14A, the seal ring 26 comprises a metallic core ring 31 having a cylindrical portion 31a pressed into the outer member 3, and a seal rubber 32 stuck on the core ring 31 to cover its one side. The seal rubber 32 has two radially inner lips 32a, 32b resiliently pressed against the outer surface of the cylindrical portion 27b of the slinger 27 and a side lip 32c resiliently pressed against the inner surface of the radial flange 27a of the slinger to seal the annular space.

Figure 14B:
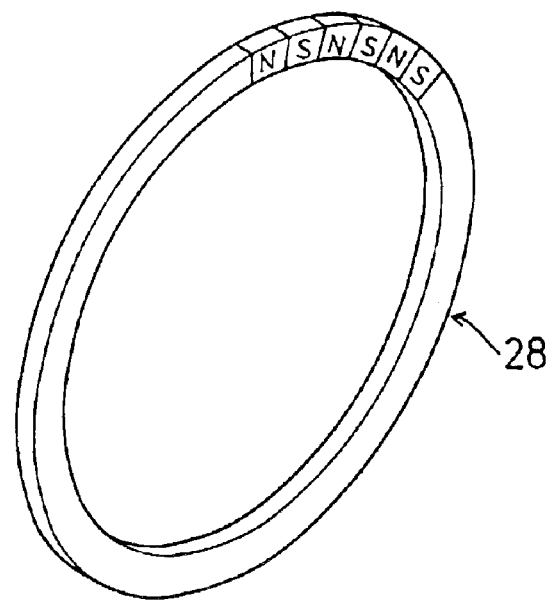
FIG. 14B is a perspective view of the encorder used in the rotation speed detector.

As shown in FIG. 14B, the encoder 28 is a ring made of a resilient magnetizable material and magnetized so that numerous N and S poles are arranged alternately in a circumferential direction. Specifically, the encoder 28 is formed by uniformly kneading e.g. a rubber or a rubber-like synthetic resin such as polyamide, polyolefin or an ethylene polymer with a magnetic powder such as barium ferrite or rare-earth magnetic powder to obtain a composite magnetizable material, crosslinking the thus obtained material, if it is rubber, shaping into a ring, and magnetizing by an ordinary magnetizing means such as a multi-polarizing yoke. The encoder ring thus formed is bonded to the radial flange 27a of the slinger 27 by vulcanization or with an adhesive. Rubbers usable for the encoder include NBR (nitrile), acrylic rubber elastomers, fluororubber elastomers and silicon elastomers. Among them, acrylic rubber elastomers, fluororubber elastomers and silicon elastomers are especially preferable because they are heat-resistant and thus can minimize the influence of heat produced during braking.

The sensor 29, which is fixed to the end of the outer member 3 by screws 33 (FIG. 14A), produces a signal indicative of the number of revolutions of the inner member 1 and thus that of the wheel based on change in fluctuating magnetic flux produced by the rotating encoder 28. The signal produced is entered into e.g. an ABS controller. The sensor 29 may be an active sensor comprising a magnetic detector element such as a magnetic resistor element whose output changes with the flow direction of the magnetic flux, and an IC (integrated circuit) having a waveform shaping circuit.

Figure 15:
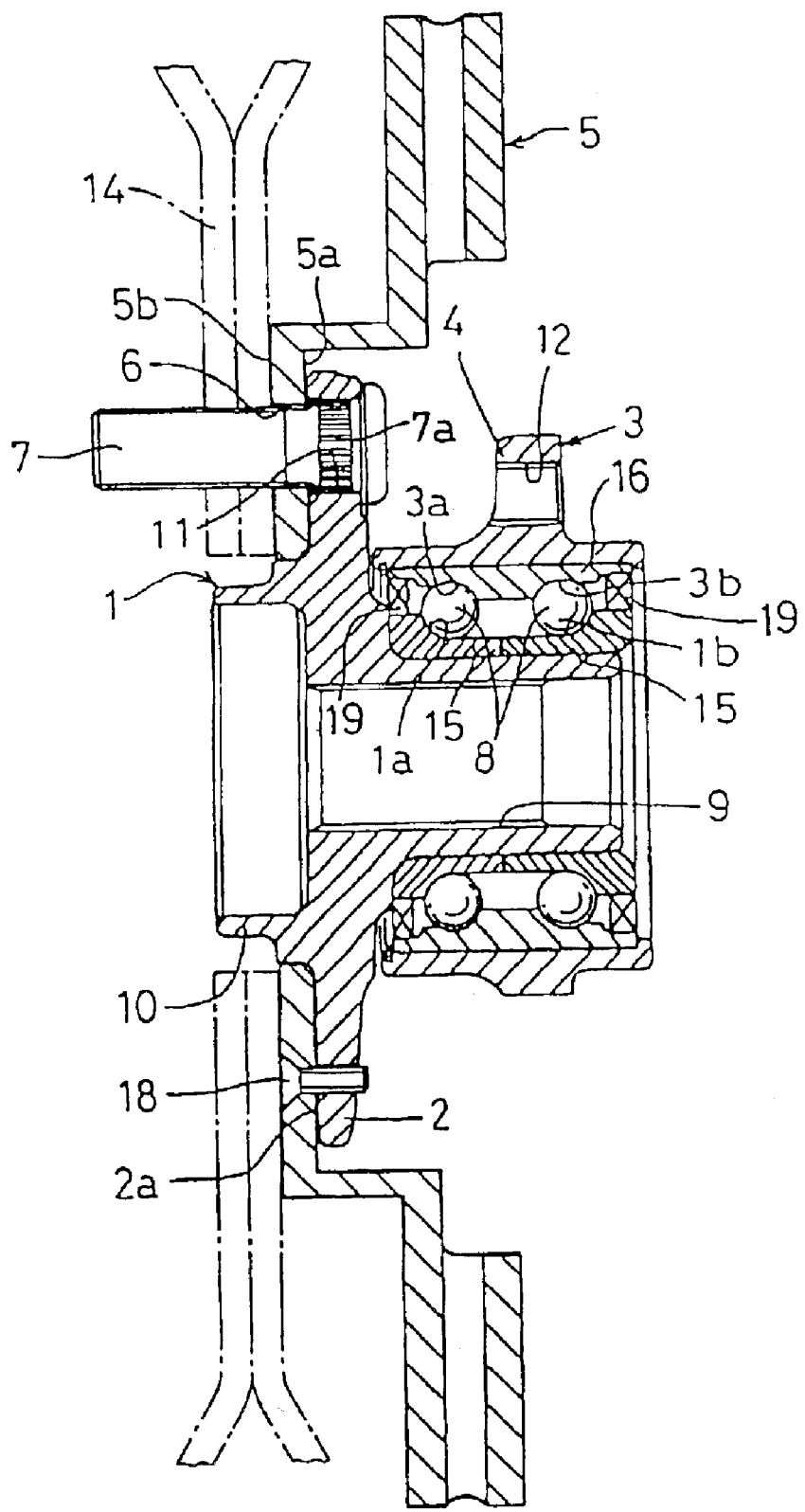
FIG. 15 is a vertical sectional view of the wheel bearing assembly of a fifth embodiment.

FIG. 15 shows a fifth embodiment, which is also a wheel bearing assembly for a driving wheel. The inner member 1 of this bearing includes two separate inner rings 15 pressed on the outer surface of the inner member 1 and each formed with a raceway 1a, 1b. The outer member 3 includes a separate outer ring 16 pressed into the inner surface of the outer member and formed with raceways 3a, 3b. As shown in FIGS. 16A and 16B, each wheel mounting bolt 7 has its head 34 cut out to form a flat side 34a. Near the edge of the bolt hole 11, the flange 2 is formed with a protrusion 35a having a flat surface to be in abutment with the flat side 34a of the bolt head 34 to prevent the bolt 7 from turning in the bolt hole 11. Otherwise, this embodiment is structurally the same as the first embodiment.

This arrangement reduces the surface pressure between serrations 7a formed at the neck of the bolt 7 and the inner wall of the bolt hole 11 and thus prevents strains from producing on the side 2a of the flange 2 on which the brake rotor 5 is mounted.

A few more arrangements for achieving the same purpose are shown in FIGS. 17–20. In the arrangement of FIGS. 17A and 17B, the head 34 of each bolt 7 is formed with two flat sides 34b and a protrusion 35b having two flat surfaces abuttting the two flat sides 34b is formed on the flange 2 around the bolt hole 11.

In the arrangement of FIGS. 18A and 18B, each bolt has a hexagonal head 34 having six sides 34c and received in a complementary hexagonal bore of a protrusion 35c formed on the flange 2 around the bolt hole 11.

In the arrangement of FIGS. 19A and 19B, each bolt has an oval head 34 received in a complementary oval bore of a protrusion 35d formed on the flange 2 around the bolt hole 11.

Figure 20A:
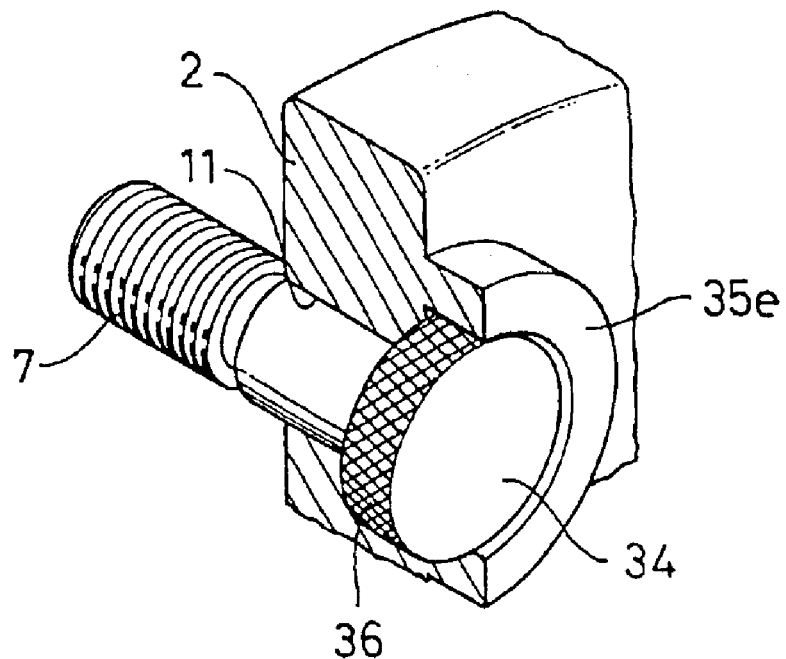
FIG. 20A is a similar view of another modified embodiment of the wheel mounting bolt before plastic deformation of the protrusion.
Figure 20B:
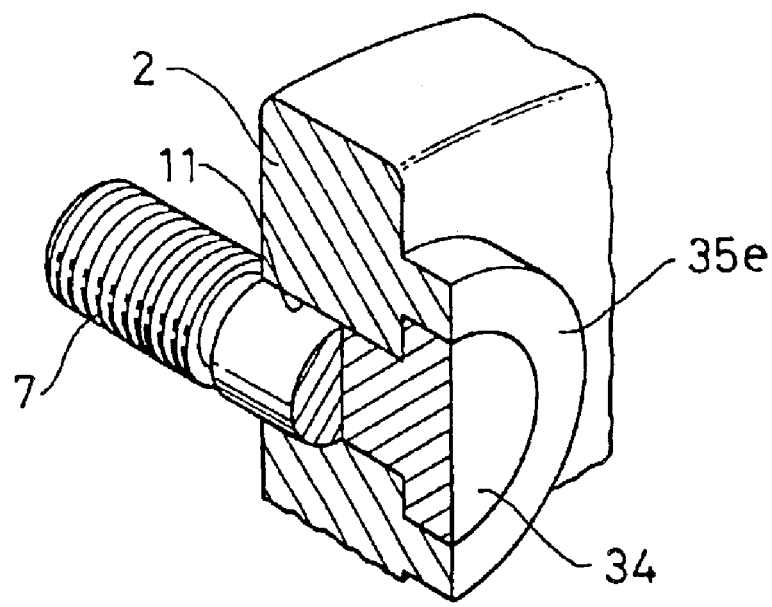
FIG. 20B is a similar view of the same after plastic deformation of the protrusion.

In the arrangement of FIGS. 20A and 20B, the bolt head 34 has a knurled side 36. An annular protrusion 35e is formed on the flange 2 around the bolt hole 11 and pressed against the knurled surface 36 by plastically deforming it by forging. Since the bolt is positively prevented from turning by this arrangement, the serrations on the neck are not necessary and thus are omitted.

Figure 21:
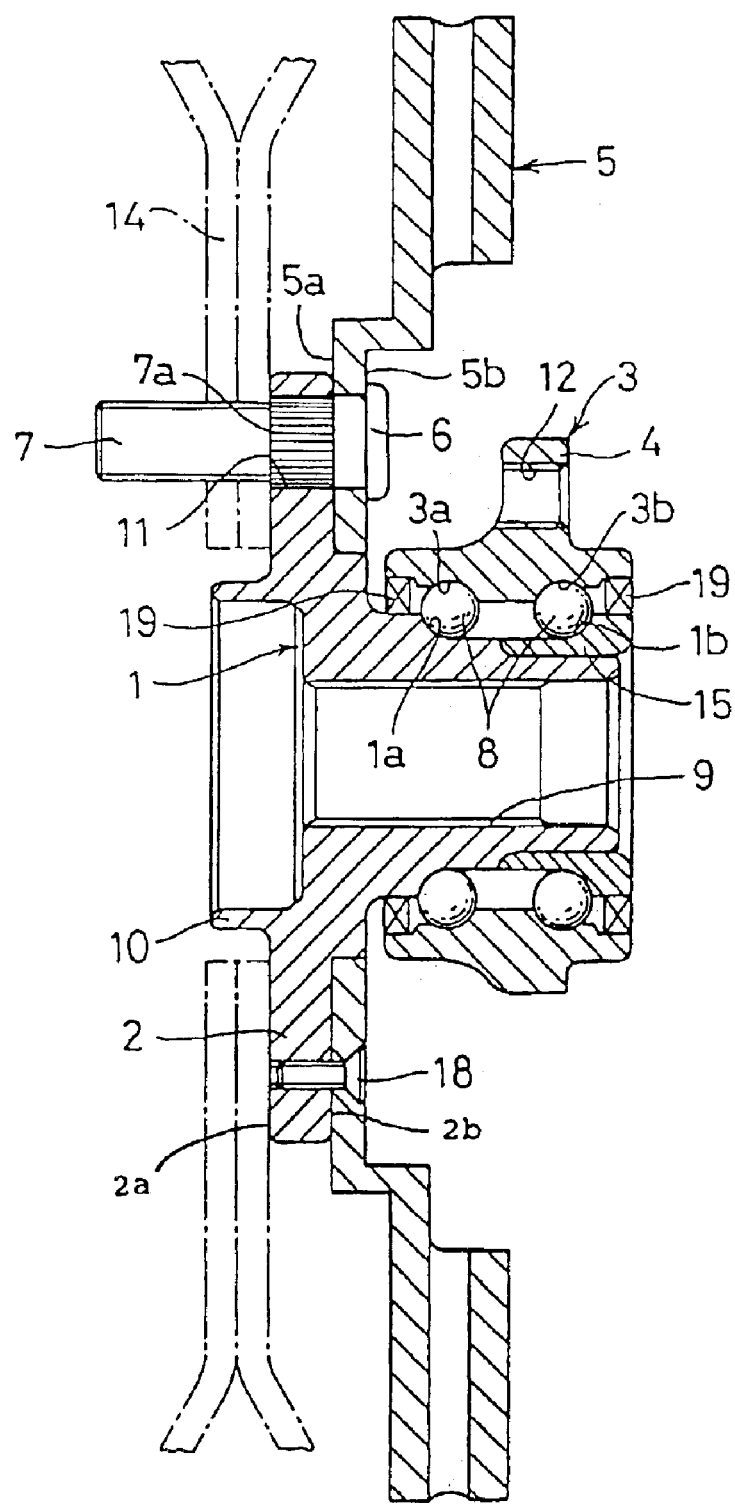
FIG. 21 is a vertical sectional view showing a sixth embodiment.

FIG. 21 shows the sixth embodiment, which is for a driving wheel. The brake rotor 5 is mounted to the inner side 2b of the flange 2 and only the hub 14 is mounted to its outer side 2a. Otherwise, this embodiment is structurally identical to the first embodiment.

Figure 22:
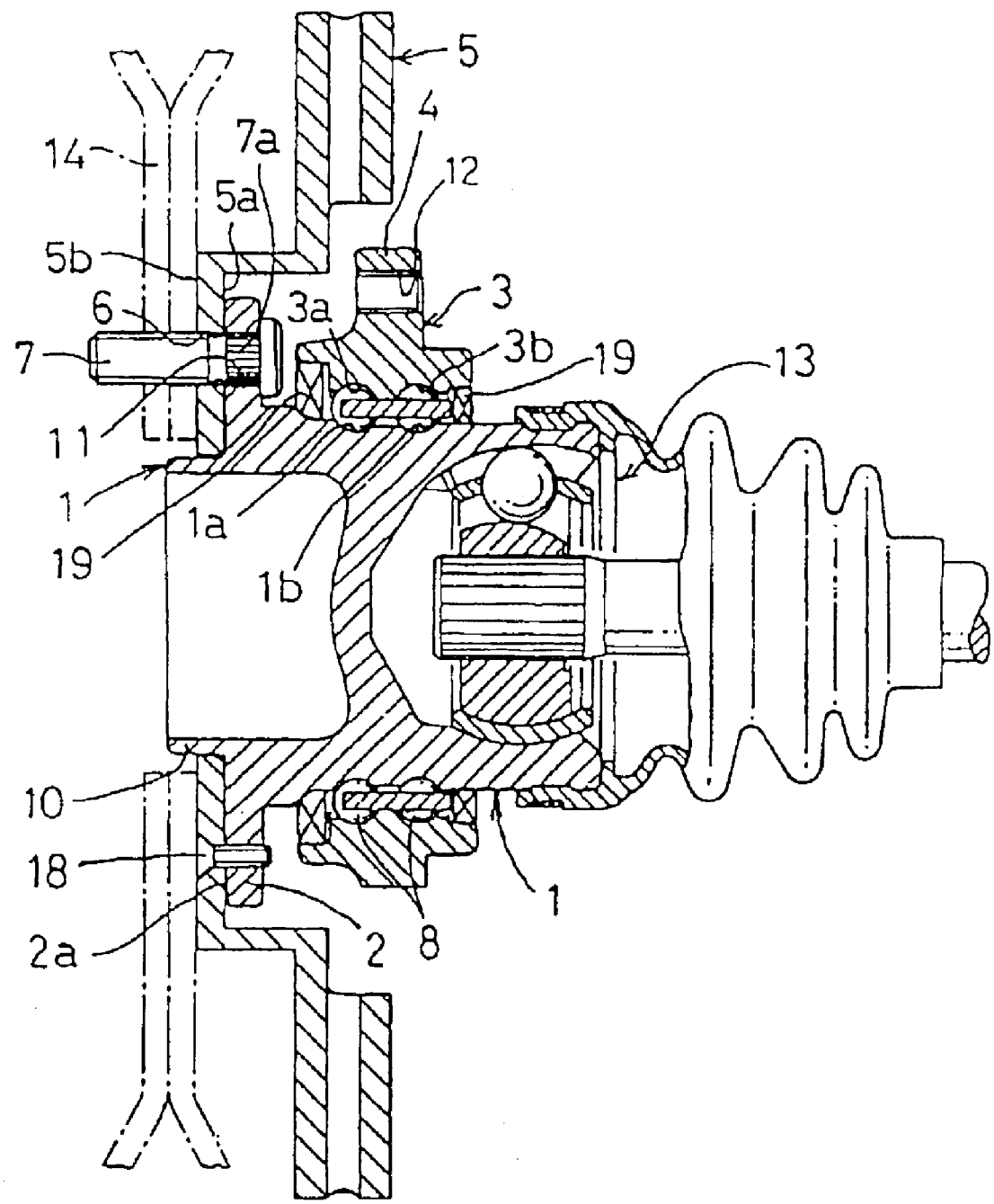
FIG. 22 is a similar view showing a seventh embodiment.

FIG. 22 shows the seventh embodiment, which is also for a driving wheel. In this embodiment, the inner member 1 is integral with an outer coupling of a constant-velocity joint 13. The raceways 1a, 1b of the inner member 1 are formed directly on the outer surface of the outer coupling of the joint 13. Otherwise, this embodiment is structurally identical to the first embodiment.

Figure 23:
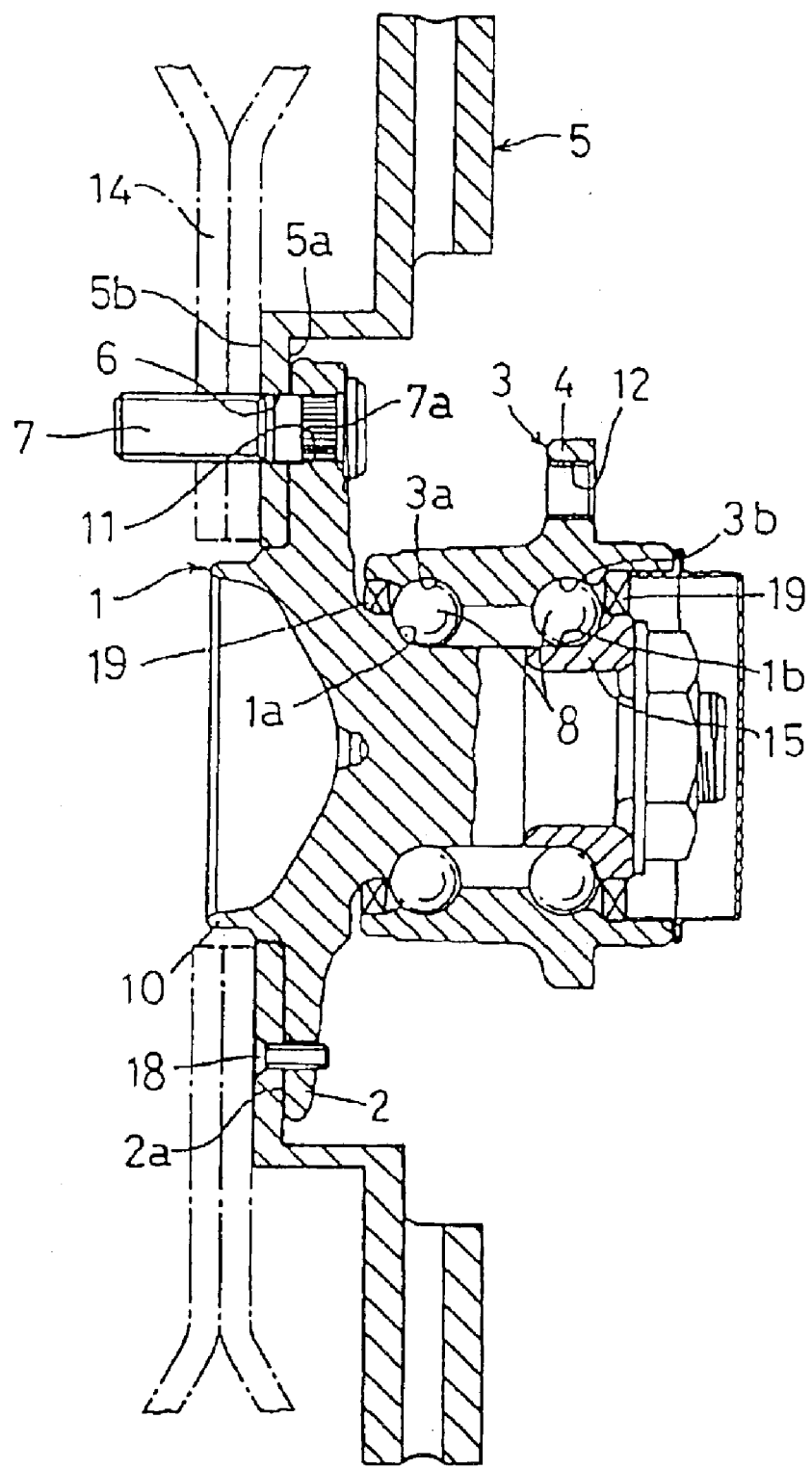
FIG. 23 is a similar view showing an eighth embodiment.

FIG. 23 shows the eighth embodiment, which is for a non-driving wheel. Like the wheel bearing assemblies described above for a driving wheel, the bearing assembly of this embodiment has an inner member 1 formed with an integral wheel mounting flange 2 extending radially outwardly from its outer surface, and a wheel pilot 10 axially protruding from its outer end face. The brake rotor 5 is secured in position between the outer side 2a of the flange 2 and the wheel hub 14 by the mounting bolts 7. The wheel bearing assembly further includes an outer member 3 having a flange 4 formed with bolt holes 12 through which bolts are inserted to secure the outer member to a stationary part of; the vehicle body.

The inner member 1 comprises a main portion formed with a first raceway 1a on its outer surface and a separate ring member 15 formed with a second raceway 1b on its outer surface. The outer member 3 has two raceways 3a and 3b formed on its inner surface so as to be opposite to the raceways 1a and 1b.

Figure 24:
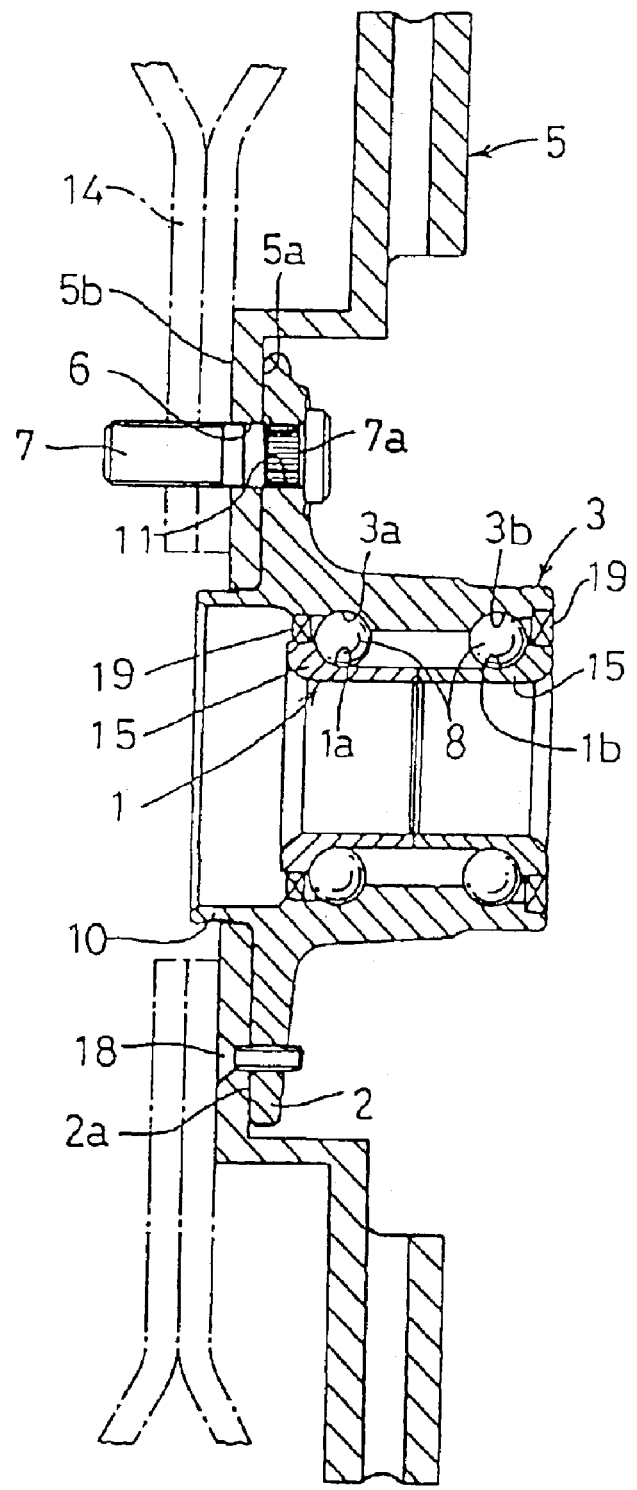
FIG. 24 is a similar view showing a ninth embodiment.
Figure 25A:
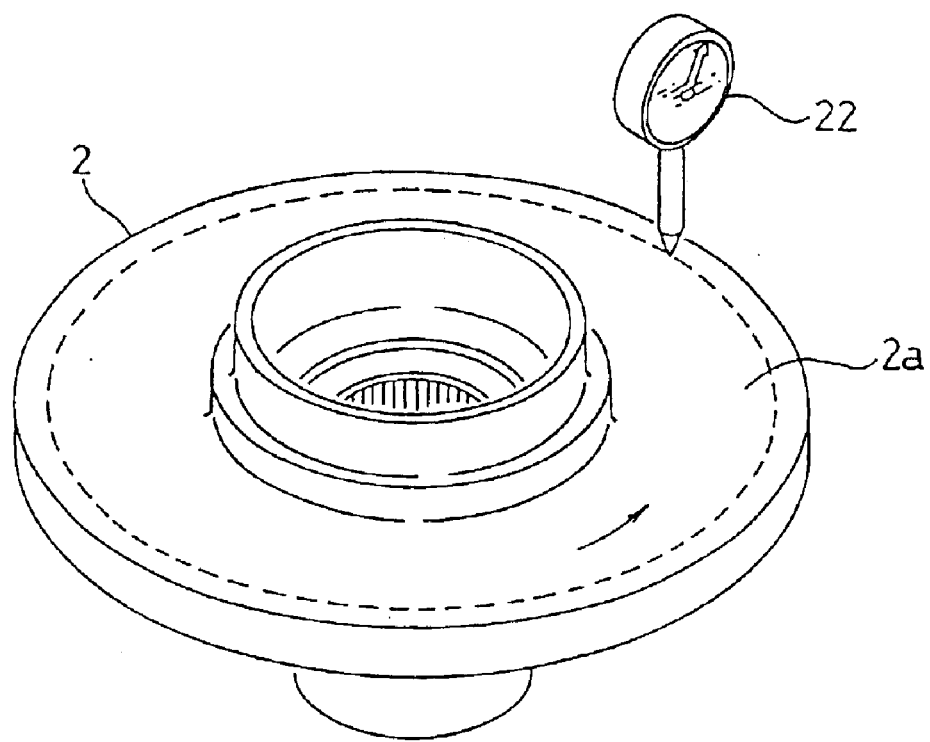
FIG. 25A is a perspective view showing how circumferential flatness of a wheel mounting flange was measured.
Figure 25B:
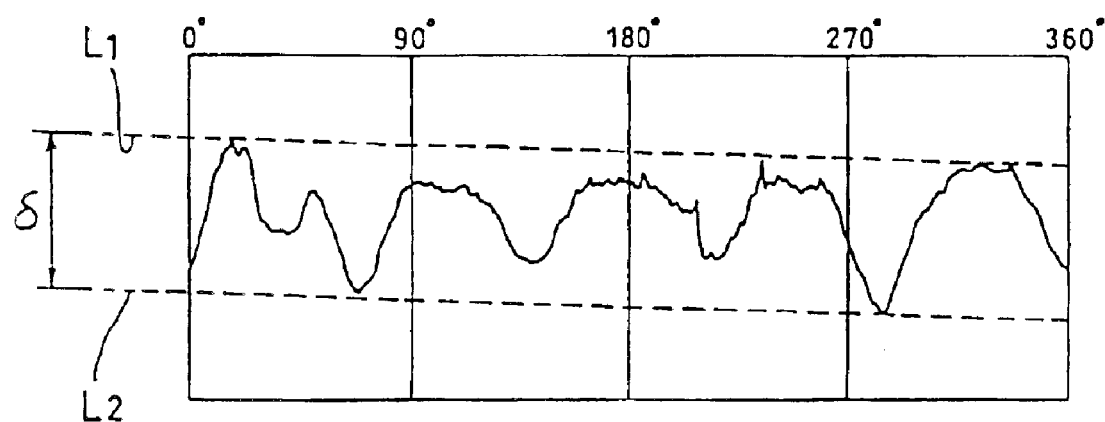
FIG. 25B is a graph for explaining how the circumferential flatness is obtained from the measuring results.

FIG. 24 shows the ninth embodiment, which is also for a non-driving wheel but differs from the eighth embodiment in that the flange 2 is integral with the outer member 3 and the inner member 1 is comprised of two inner rings 15. Like the eighth embodiment, the rotor 5 is secured to the outer side 2a of the flange 2.

The outer member 3 is formed with raceways 3a, 3b directly on its inner periphery and the inner rings 15 (forming the inner member 1) formed with raceways 1a, 1b are mounted inside of the outer member 3 through rolling members 8.

The wheel bearing assembly of this embodiment is fastened with the inner member 1 mounted on a stationary axle. In order to measure the runout of the side 2a of the wheel mounting flange 2 as shown in FIG. 5, the inner member 1 was fixed on a reference shaft, and the outer member 3 formed with the wheel mounting flange 2 was turned by one full turn, and the runout of the side 2a of the flange 2 was measured by use of a dial gauge 22.

A tenth embodiment is a wheel bearing assembly for a driving wheel. It comprises an inner member 1 having a first inner member and a second inner member which is an outer coupling of a constant-velocity joint. The first inner member is formed with a wheel mounting flange 2 with which the brake rotor 5 is integrally formed. The first inner member is formed with a splined hole 9 in its inner periphery. The second inner member 1d has a cylindrical portion fitted in the splined hole 9 of the first inner member. By deforming the end of the cylindrical portion, the first and second inner members are inseperably coupled together.

The outboard raceway, is formed on a separate inner ring pressed on the cylindrical portion of the first inner member and the inboard raceway is formed directly on the second inner member. Otherwise, this embodiment is the same as the first embodiment. The maximum runout variation of the rotor braking surface 5c is restricted to not more than 50 $\mu$m.

Also, with the wheel bearing assembly according to this invention, since the maximum variation of runout of the brake rotor mounting surface of the wheel mounting flange provided on one of the inner and outer members is restricted within a predetermined value, and a dimension-controlled negative axial clearance is formed between the plurality of rows of rolling elements and raceways to increase rigidity of the wheel bearing assembly, or the brake rotor mounting surface is made as an outer side of the wheel mounting flange, and this outer side is inclined to the outer side toward the tip side of the wheel mounting flange so that the brake rotor is supported by the outer peripheral portion of this side with good stability, it is possible to suppress runout of the braking surfaces during rotation of the brake rotor.

What is claimed is:

1. A method of assembling a wheel supporting assembly for supporting a wheel on a vehicle body, said method comprising:
   providing a brake rotor having a mounting surface;
   predetermining a maximum runout variation for the mounting surface of the brake rotor;
   machining the mounting surface to have a runout variation that is less than or equal to the maximum runout variation;
   preparing a wheel bearing assembly including rolling elements in two rows and a rotary member having a wheel mounting flange; and
   mounting the brake rotor to the wheel mounting flange, with the wheel mounting flange supported on the mounting surface of the brake rotor.

2. The method of claim 1, wherein said providing a brake rotor comprises providing a brake rotor having a second surface on a side opposite of the mounting surface, and
   wherein the second surface has a maximum runout variation equal to or less than 50 $\mu$m.

3. The method of claim 1, wherein said providing a brake rotor comprises providing a brake rotor having a runout variation per cycle of the mounting surface that is less than or equal to a first value.

4. The method of claim 3, wherein said providing a brake rotor comprises providing a brake rotor having a second surface on a side opposite of the mounting surface, and
   wherein the second surface has a maximum runout variation equal to or less than 50 $\mu$m.

5. The method of claim 3, wherein said providing a brake rotor comprises providing a brake rotor having a mounting surface that has a maximum runout variation equal to 30 $\mu$m.

6. The method of claim 1, wherein said providing a brake rotor comprises providing a brake rotor having at least one of the maximum difference between the peak values of crests and the maximum difference between the peak values of troughs in each cycle of runout of the mounting surface being less than or equal to a first value.

7. The method of claim 6, wherein said providing a brake rotor comprises providing a, brake rotor having a second surface on a side opposite of the mounting surface, and
   wherein at least one of the maximum difference between the peak values of crests and the maximum difference between the peak values of troughs in each cycle of runout of the second surface is less than or equal to the first value.

8. The method of claim 6, wherein said predetermining a maximum runout variation comprises predetermining the maximum runout variation to be equal to 30 $\mu$m, and
   wherein the first value is 30 $\mu$m.

9. The method of claim 1, wherein said mounting the brake rotor to the wheel mounting flange comprises bolting the brake rotor to the wheel mounting flange with a number of wheel mounting bolts, and wherein said providing a brake rotor comprises providing a brake rotor having a frequency of runout of the mounting surface per rotation of the mounting surface that is an integer multiple of the number of wheel mounting bolts.

10. The method claim 1, wherein said mounting the brake rotor to the wheel mounting flange comprises bolting the brake rotor to the wheel mounting flange with a number of wheel mounting bolts, and wherein said providing a brake rotor comprises providing a brake rotor having a number of wheel mounting bolts that is an integer multiple of a frequency of the runout of the mounting surface per rotation of the mounting surface.

11. A method of assembling a wheel supporting assembly for supporting a wheel on a vehicle body, said method comprising:

forming a wheel mounting flange on one of an outer member having an inner surface with two outer member raceways thereon and an inner member having an outer surface with two inner member raceways thereon, said wheel mounting flange having a brake rotor mounting surface;

assembling together the outer member, the inner member and two rows of rolling elements to form a wheel bearing assembly such that the two outer member raceways oppose the two inner member raceways with the rolling elements disposed therebetween;

predetermining a maximum runout variation for the brake rotor mounting surface;

machining the brake rotor mounting surface to have a runout variation that is less than or equal to the maximum runout variation; and mounting the brake rotor to the wheel mounting flange such that the brake rotor mounting surface abuts the brake rotor.

12. The method of claim 11, wherein said brake rotor mounting surface has a maximum runout variation per cycle of the brake rotor mounting surface that is less than or equal to a first value.

13. The method of claim 12, wherein said brake rotor mounting surface has a maximum runout variation per cycle of the brake rotor mounting surface that is equal to 30 $\mu$m.

14. The method of claim 11, wherein said brake rotor mounting surface has one of the maximum difference between the peak values of crests and the maximum difference between the peak values of troughs in each cycle of runout of the brake rotor mounting surface that is less than or equal to a first value.

15. The method of claim 14, wherein the first value is equal to 30 $\mu$m.

16. The method of claim 11, wherein said mounting the brake rotor to the wheel mounting flange comprises bolting the brake rotor to the wheel bearing mounting flange with a number of wheel mounting bolts, and wherein said brake rotor mounting surface has a frequency of runout per rotation of the brake rotor mounting surface that is an integer multiple of the number of wheel mounting bolts.

17. The method of claim 11, wherein said mounting the brake rotor to the wheel mounting flange comprises bolting the brake rotor to the wheel mounting flange with a number of wheel mounting bolts, and wherein said providing a brake rotor comprises providing a brake rotor having a number of wheel mounting bolts that is an integer multiple of the frequency of the runout of the mounting surface per rotation of the mounting surface.

18. The method of claim 11, wherein said forming a wheel mounting flange comprises unitarily forming the wheel mounting flange and the inner member.

19. The method of claim 11, wherein said brake rotor mounting surface has a maximum runout variation that is less than or equal to a first value.

20. The method of claim 19, wherein the first value is less than or equal to 100 $\mu$m.

21. The method of claim 20, wherein said brake rotor mounting surface has a maximum runout variation of the brake surface that is 50 $\mu$m.

22. The method of claim 11, further comprising mounting a drive shaft in the inner member.

23. The method of claim 11, further comprising:

fixing a raceway member to the inner member, wherein said forming a wheel mounting flange comprises directly forming one of the two raceways on the inner member, and wherein said forming a wheel mounting flange further comprises forming the other of the two raceways on the raceway member.

* * * * *